United States Patent [19]
Nishizaka et al.

[11] Patent Number: 5,649,076
[45] Date of Patent: Jul. 15, 1997

[54] METHOD OF GENERATING OR MODIFYING SOLID MODEL OF AN OBJECT ACCORDING TO CROSS-SECTIONAL SHAPES AND A PREDETERMINED RELATIONSHIP AND APPARATUS SUITABLE FOR PRACTICING THE METHOD

[75] Inventors: Koichi Nishizaka, Toyota; Akihiko Higashi, Hiroshima; Jun Mukai, Toyota, all of Japan

[73] Assignee: Toyota Jidosha Kabushiki Kaisha, Toyota, Japan

[21] Appl. No.: 286,570

[22] Filed: Aug. 5, 1994

[30] Foreign Application Priority Data

Aug. 6, 1993 [JP] Japan .................................. 5-196340
Dec. 24, 1993 [JP] Japan .................................. 5-328984

[51] Int. Cl.$^6$ .................................................. G06T 17/40
[52] U.S. Cl. .................................. 395/119; 364/468.09
[58] Field of Search .................................. 395/118, 119, 395/120; 364/468.03, 468.04, 468.09–468.1, 468.11, 468.12

[56] References Cited

U.S. PATENT DOCUMENTS

| | | | |
|---|---|---|---|
| 4,791,583 | 12/1988 | Colburn | 395/120 |
| 5,115,400 | 5/1992 | Watanabe et al. | 364/474.24 |
| 5,257,346 | 10/1993 | Hanson | 395/125 |
| 5,265,197 | 11/1993 | Kondo | 395/120 |
| 5,278,983 | 1/1994 | Kawabe et al. | 395/120 |
| 5,280,569 | 1/1994 | Tsujido | 395/127 |
| 5,297,022 | 3/1994 | Watanabe et al. | 364/191 |
| 5,297,241 | 3/1994 | Hirr, Jr. et al. | 395/127 |
| 5,323,326 | 6/1994 | Saito et al. | 364/474.24 |

FOREIGN PATENT DOCUMENTS

| | | |
|---|---|---|
| 62-114084 | 5/1987 | Japan . |
| 62-251965 | 11/1987 | Japan . |
| 241573 | 2/1990 | Japan . |
| 4155585 | 5/1992 | Japan . |

OTHER PUBLICATIONS

Swivel 3D Professional, *VPL Research*, 1991, pp. 2–4 to 2–14 and 5–11 to 5–21.

*Primary Examiner*—Heather R. Herndon
*Assistant Examiner*—Rudolph Buchel
*Attorney, Agent, or Firm*—Kenyon & Kenyon

[57] ABSTRACT

Method and apparatus for generating a solid model of a structural assembly, or solid models of components of such assembly, according to cross sectional shapes of the components and attributes associated with the cross sectional shapes, wherein the components are initially defined by wire frame models or surface models represented by suitable shape data such wire frame data. When a structural assembly is modified in design, the shape data are changed, and the corresponding cross sectional shapes and attributes are changed, so that a modeler modifies the already generated solid model or models, on the basis of the changed cross sectional shapes and attributes. The apparatus includes part data files for respective structural assemblies, and each part data file has component data files for respective components of each assembly, and a relation data file storing component relation data representative of positional relationship of the components of the assembly. Each component data file storing wire frame data and solid model data in respective memory areas thereof.

8 Claims, 22 Drawing Sheets

METHOD OF GENERATING OR MODIFYING SOLID MODEL OF AN OBJECT ACCORDING TO CROSS-SECTIONAL SHAPES AND A PREDETERMINED RELATIONSHIP AND APPARATUS SUITABLE FOR PRACTICING THE METHOD

BACKGROUND OF THE INVENTION

1. Field of the Invention

The present invention relates to a method of generating or modifying a solid model of a structural object, and an apparatus suitable for practicing the method to generate or modify such solid model.

2. Discussion of the Related Art

A solid model generator is used in designing a structural object or solid such as automotive parts, die sets used on a press, or other components of a structural assembly. Such a solid model generator includes a solid modeler adapted to receive data representative of shapes in specified cross sectional planes of the structural object, and data indicative of attributes of such cross sectional shapes. These shapes and attributes cooperate to define the geometry of the object. The solid modeler automatically generates a solid model of the object according to the received cross sectional shapes and the attributes. When a structural assembly such as a part of an automobile or a die set used on a press is modified in design for use on another type of automobile or for partial re-modelling of the automobile, the operator of the solid model generator operates an appropriate data input device to identify the automotive part or die set to be re-designed or modified in design, and select each component of the structural assembly to be displayed on a display screen. The operator further operates the data input device to change the cross sectional shapes and attributes of each component to modify the component, as needed, so that the solid modeler automatically modifies the original solid model, namely, automatically generates a solid model of the component as modified, and display the newly generated solid model of the modified component. The above operation should be repeated for each of the components of the structural assembly that should be modified in design.

The solid model generator indicated above uses a general-purpose CAD (computer-aided design) software for dealing with the operator's commands to designate the desired component to be modified and change object-defining parameters in the form of the cross sectional shapes and attributes described above. The solid modeler operates also according to the CAD software, to generate the solid model of the modified component. Since the solid modeler requires a considerably long processing time to modify the solid model of each component, the operator should wait an accordingly long time, at the site of the peripheral data input device. Where two or more components of the structural assembly in question should be modified in design, the cumulative waiting time of the operator as a designer of the structural assembly is substantially prolonged, leading to unsatisfactory designing efficiency on the side of the designer. In the case of dimensional or geometric modification of the two or more components of the structural assembly, the designer usually considers the compatibility of the modified components with respect to each other and with respect to the non-modified components, in terms of their attachment or connection to or engagement with each other or their dimensional coordination. As a result of these considerations, the designer is sometimes required to re-modify the component or components so as to correct or overcome defects or incompatibility of the modified and non-modified components in a trial-and-error fashion. In such event, two or more processing operations are performed by the solid modeler for each of the components that are modified from their original design, whereby the cumulative or total processing time required by the solid modeler tends to be increased, resulting in reduced designing efficiency.

In some solid model generators, the cross sectional shapes and attributes used to generate solid models of structural components are given by wire frame data representative of two-dimensional wire frame models. Each wire frame model consists of shape definition lines which define a shape or geometry of the appropriate component. Such solid model generators may be adapted such that the initially generated or prepared wire frame models are used to generate the corresponding surface models, so that the corresponding solid models are generated on the basis of the surface models.

In such solid model generators, solid model data representative of solid models of different components (A, B, C) are stored in respective solid model data files, while wire frame data or surface model data are stored in a design-concept data file, together with design concept data which identify the components (A, B, C) constituting an assembly and indicate a positional relationship between the components, as indicated in FIG. 22. Further, relation data indicating a relationship between the solid models of these components and wire frame models or surface frame models represented by the wire frame data or surface model data are stored in a relation data file, as also indicated in FIG. 22. The wire frame data and design concept data stored in the design-concept data file are treated as a unit or a batch of data, and the wire frame data of the component A cannot be retrieved alone, independently of the wire frame data of the component B, for example. When it is desired to use the wire frame model of the component A of the assembly (A, B, C), the wire frame models of all the three components A, B, C are first displayed on a screen such that these three wire frame models are disposed in the positional relationship defined by the design concept data. In this condition, the wire frame data in the design-concept data file are modified so that the wire frame models of the unnecessary components B and C are removed or erased, and the remaining wire frame model of the necessary component A is changed as needed. The thus modified wire frame model data are used to generate a solid model of a new structural assembly which includes the modified component A. If the new structural assembly consists of the component A of the assembly (A, B, C) and another component which is a component of another structural assembly whose wire frame data and design concept data are stored in another design-concept data file, a similar operation should be repeated to generate a solid model of the new assembly. Since the operations required to utilize the already stored wire frame data and design concept data are cumbersome and time-consuming described above, there is a high possibility of operational errors occurring during the modification of the wire frame data (surface model data), and the efficiency of generating a solid model of a structural assembly tends to be low.

SUMMARY OF THE INVENTION

It is therefore a first object of the present invention to provide a method of modifying solid models of structural components, which method permits high designing efficiency with a minimum of waiting time on the side of the designer who uses a solid model generator that generates the modified solid models.

The first object indicated above may be achieved according to one aspect of the present invention, which provides a method of modifying solid models of a plurality of designated components, which have already been generated by a solid model generating apparatus wherein a solid modeler automatically generates solid models representative of a plurality of components according to cross sectional shapes of the components and attributes associated with the cross sectional shapes, the cross sectional shapes and attributes defining the solid models of the components, the method comprising the steps of: (a) preparing a plurality of shape data files storing respective sets of shape data representative of shapes of the plurality of designated components; (b) successively changing the shape data sets representative of the designated components, to modify the solid models of the designated components; (c) changing the cross sectional shapes and/or the attributes of the designated components on the basis of the changed shape data sets of the desired components, and according to a predetermined relationship between the changed shape data sets and the cross sectional shapes and/or the attributes; and (d) activating the solid modeler to successively modify the already generated solid models of the designated components, on the basis of the cross sectional shapes and the attributes at least one of which has been changed.

To generate solid models of the designated components which are modified in design, namely, to modify the already generated solid models of the designated components, the shape data sets already stored in the respective shape data files are successively changed one after another, and the cross sectional shapes of the designated components and/or the attributes associated with the cross sectional shapes are changed on the basis of the changed shape data sets of the designated components, and according to the predetermined or known relationship between the changed shape data sets and the cross sectional shapes and/or the attributes. Then, the solid modeler is activated to successively modify the already generated solid models of the designated components, on the basis of the changed cross sectional shapes and the changed attributes at least one of which has been changed, that is, on the basis of the changed cross sectional shapes and attributes, or the changed cross sectional shapes and the unchanged attributes, or the unchanged cross sectional shapes and the changed attributes.

According to the present method, at least one of the cross sectional shape and the attribute associated with the cross sectional shape is changed for each designated component, on the basis of the shape data set which has been changed according to a desired change of design of each designated component. This change of the cross sectional shape and/or the attribute is automatically effected according to the predetermined relationship between the shape data set and those cross sectional shape and attribute. Subsequently, the solid modeler of the apparatus is activated to automatically modify the already generated solid model of each designated component, on the basis of the cross sectional shape and the attribute at least one of which has been changed. Thus, the modification of the solid models on the basis of the changed shape data sets does not require the attendance of the operator or designer, and can be automatically and unattendedly performed at night. Accordingly, the operator does not have to wait at the peripheral data input device of the solid model generating apparatus, whereby the time required for the operator to attend the apparatus can be reduced to less than a half of the conventional requirement, and the component designing efficiency is accordingly improved.

A second object of the invention is to provide a solid model generating apparatus suitable for practicing the above method.

The above second object can be achieved according to a second aspect of the invention, which provides an apparatus for modifying solid models of a plurality of designated components, which have already been generated by a solid model generating apparatus wherein a solid modeler automatically generates solid models representative of a plurality of components according to cross sectional shapes of the components and attributes associated with the cross sectional shapes, the cross sectional shapes and attributes defining the solid models of the components, the apparatus comprising: (a) shape data file memory means having a plurality of shape data files (16a) storing respective shape data sets representative of shapes of the plurality of designated components; (b) altering means for successively changing the shape data sets representative of the designated components, to modify the solid models of the designated components; (c) definition data updating means for changing the cross sectional shapes and/or the attributes of the designated components on the basis of the changed shape data sets of the designated components, and according to a predetermined relationship between the changed shape data sets and the cross sectional shapes and/or the attributes; and (d) solid model modifying means for activating the solid modeler to successively modify the already generated solid models of the designated components, on the basis of the cross sectional shapes and the attributes at least one of which has been changed.

In the present apparatus adapted to modify the already generated solid models of the designated components, the shape data sets already stored in the respective shape data files are successively changed by the altering means, and the cross sectional shapes of the designated components and/or the attributes associated with the cross sectional shapes are changed by the definition data updating means, on the basis of the changed shape data sets of the designated components, and according to the predetermined or known relationship between the changed shape data sets and the cross sectional shapes and/or the attributes. Then, the solid model modifying means activates the solid modeler to successively modify the already generated solid models of the designated components, on the basis of the changed cross sectional shapes and the changed attributes at least one of which has been changed.

Thus, the present apparatus is adapted such that at least one of the cross sectional shape and the attribute associated with the cross sectional shape is automatically changed by the definition data updating, for each designated component, on the basis of the shape data set changed by the altering means and according to the predetermined relationship between the shape data set and those cross sectional shape and attribute. Subsequently, the solid modeler of the apparatus is activated by the solid model modifying means, to automatically modify the already generated solid model of each designated component, on the basis of the cross sectional shape and the attribute at least one of which has been changed. Thus, the modification of the solid models on the basis of the changed shape data sets does not require the attendance of the operator or designer, and can be automatically and unattendedly performed at night. Accordingly, the operator does not have to wait at the peripheral data input device of the solid model generating apparatus, whereby the time required for the operator to attend the apparatus can be reduced to less than a half of the conventional requirement, and the component designing efficiency is accordingly improved.

According to one form of the apparatus, each of the shape data sets stored in the shape data files includes wire frame data representative of a two-dimensional wire frame model consisting of shape definition lines which define a shape of a corresponding one of the designated components. In this case, the apparatus may further comprise a display device and a data input device, so that the altering means activates the display device to display the wire frame models of the designated components on a same screen of the display device in a predetermined positional relationship with each other, and receives from the data input device data necessary to change the wire frame data representative of the wire frame model of each of the designated component. Generally, the dimensional or geometric modification of two or more components of a structural assembly requires the designer to consider the compatibility of the modified components with respect to the non-modified components, in terms of their attachment or connection to each other or dimensional coordination. In some cases, the designer is required to re-modify the component or components so as to correct or overcome incompatibility of the modified and non-modified components in a trial-and-error fashion. In the present embodiment, the dimensional and positional compatibility or coordination of the two or more components can be readily checked while the wire frame models are displayed on the same screen of the display device, even if the wire frame models are changed by the altering means two or more times. Further, each component is initially defined by two-dimensional figures or wire frame models, which can be processed at a higher speed than in the conventional system in which the three-dimensional data processing is required for modifying the solid model of each component. Therefore, the present arrangement permits designing or modification of the components with improved efficiency and reduced time of repeated processing in the trial-and-error fashion.

According to another form of the apparatus, each of the shape data sets stored in the shape data files includes attribute definition data corresponding to each of the attributes, and the altering means receives from a data input device data necessary to change the attribute definition data.

A third object of the invention is to provide a method of generating a solid model of a structural assembly, which permits easy utilization of already generated solid models of components of another structural assembly, and which assures increased designing or re-designing efficiency and reduced designing error.

A fourth object of the invention is to provide a solid model generating apparatus suitable for practicing the above method.

The above third object may be achieved according to a third aspect of this invention, which provides a method of generating solid models of structural assemblies each consisting of a plurality of components (Ai, Bi, Aii, Bii, Aiii, Biii), according to cross sectional shapes of the components and attributes associated with the cross sectional shapes, the cross sectional shapes being based on wire frame models defining shapes of the components of each structural assembly, the method comprising the steps of: (a) providing a plurality of part data files corresponding to the plurality of structural assemblies, each of the part data files including a plurality of component data files corresponding to the plurality of components of each structural assembly, and a relation data file; (b) storing wire-frame-related data or surface model data and solid model data of each of the components of each structural assembly, in respective areas of a corresponding one of the component data files of a corresponding one of the part data files, the wire-frame-related data including wire frame data representative of the wire frame models of the components, and the surface model data being representative of surface models of the components, while the solid model data being representative of the solid models of the components; and (c) storing component relation data of each structural assembly in the relation data file of the corresponding part data file, the component relation data being representative of a positional relationship of the plurality of components of each structural assembly.

In the solid model generating method according to the third aspect of this invention, the wire-frame-related data or the corresponding surface model data and the solid model data of each component of a structural assembly are stored in respective areas of the corresponding one of the component data files of the part data file for the structural assembly. Further, the part data file has the relation data file in which are stored the component relation data representative of the positional relationship of the components of the structural assembly in question.

According to the present method, therefore, the wire-frame-related data including the wire frame data or the surface model data of any component of any structural assembly can be retrieved together with the corresponding solid model data, from the corresponding component data file of the part data file for the appropriate structural assembly. Thus, for example, the wire-frame-related data and the solid model data of a desired component of a certain structural assembly can be retrieved and utilized to generate a solid model of a new structural assembly, independently of the wire-frame-related data and the solid model data of the other component or components of that structural assembly, whereby there is no need to eliminate or erase the wire-frame-related data and the solid model data of the components that are not utilized for the new structural assembly. Accordingly, the present method assures significantly improved efficiency of designing a new structural assembly or re-designing an already designed structural assembly, and reduced error of designing or re-designing of a structural assembly utilizing the data stored in the part data files.

The wire-frame-related data may further include relation data representative of a positional relationship between the wire frame model of each component of each structural assembly and the solid model of each component. The wire-frame-related data may also include attribute data representative of the attribute associated with each cross sectional shape element which defines each component.

The fourth object indicated above may be achieved according to a fourth aspect of the present invention, which provides an apparatus for generating solid models of structural assemblies each consisting of a plurality of components, according to cross sectional shapes of the components and attributes associated with the cross sectional shapes, the cross sectional shapes being based on wire frame models defining shapes of the components of each structural assembly, the apparatus comprising: (a) a plurality of part data files corresponding to the plurality of structural assemblies, each of the part data files including a plurality of component data files corresponding to the plurality of components of each structural assembly, and a relation data file; (b) first data storage control means for storing wire-frame-related data or surface model data and solid model data of each of the components of each structural assembly, in respective areas of a corresponding one of the component data files of a corresponding one of the part data files, the wire-frame-related data including wire frame data representative of the wire frame models of the components, and the surface model data being representative of surface models of the components, while the solid model data being representative of the solid models of the components; and (c) second data storage control means for storing component relation data of each structural assembly in the relation data file of the corresponding part data file, the component relation data being representative of a positional relationship of the plurality of components of each structural assembly.

The present apparatus provides substantially the same advantages as the method according to the third aspect of the invention described above.

The above-indicated respective areas of each of the component data files may consist of a wire frame data area and a solid model data area for storing the wire-frame-related data and the solid model data, respectively. In this case, the wire frame data area may further store relation data representative of a positional relationship between the wire frame model of each component of each structural assembly and the solid model of each component, and may further store attribute data representative of the attribute associated with each cross sectional shape element which defines each component.

The apparatus may further comprise an output device for reproducing the solid models of the structural assemblies, according to the solid model data. In this instance, the apparatus may further comprise output control means for retrieving the wire-frame-related data or the surface model data and the solid model data from the component data files of one of the part data files which corresponds to one of the structural assemblies when the solid model of that structural assembly is reproduced. The output control means is adapted to erase the retrieved wire-frame-related data or the surface model data so that only the retrieved solid model data are used to reproduce the solid model of the structural assembly. This arrangement facilitates displaying of the solid model or models of a desired component or components or the solid model of a desired structural assembly, or production of a drawing or drawings of the component or components or structural assembly on a suitable recording device as the output device such as a printer or plotter according to the solid model data. This feature is effective to further improve the efficiency of designing a component or a structural assembly.

While the output device such as a display device and a recording device may be a part of the apparatus, as indicated above, the output device may be an external device connected to the present apparatus. In this case, the solid model data retrieved from the appropriate part data files are sent to such external output device.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
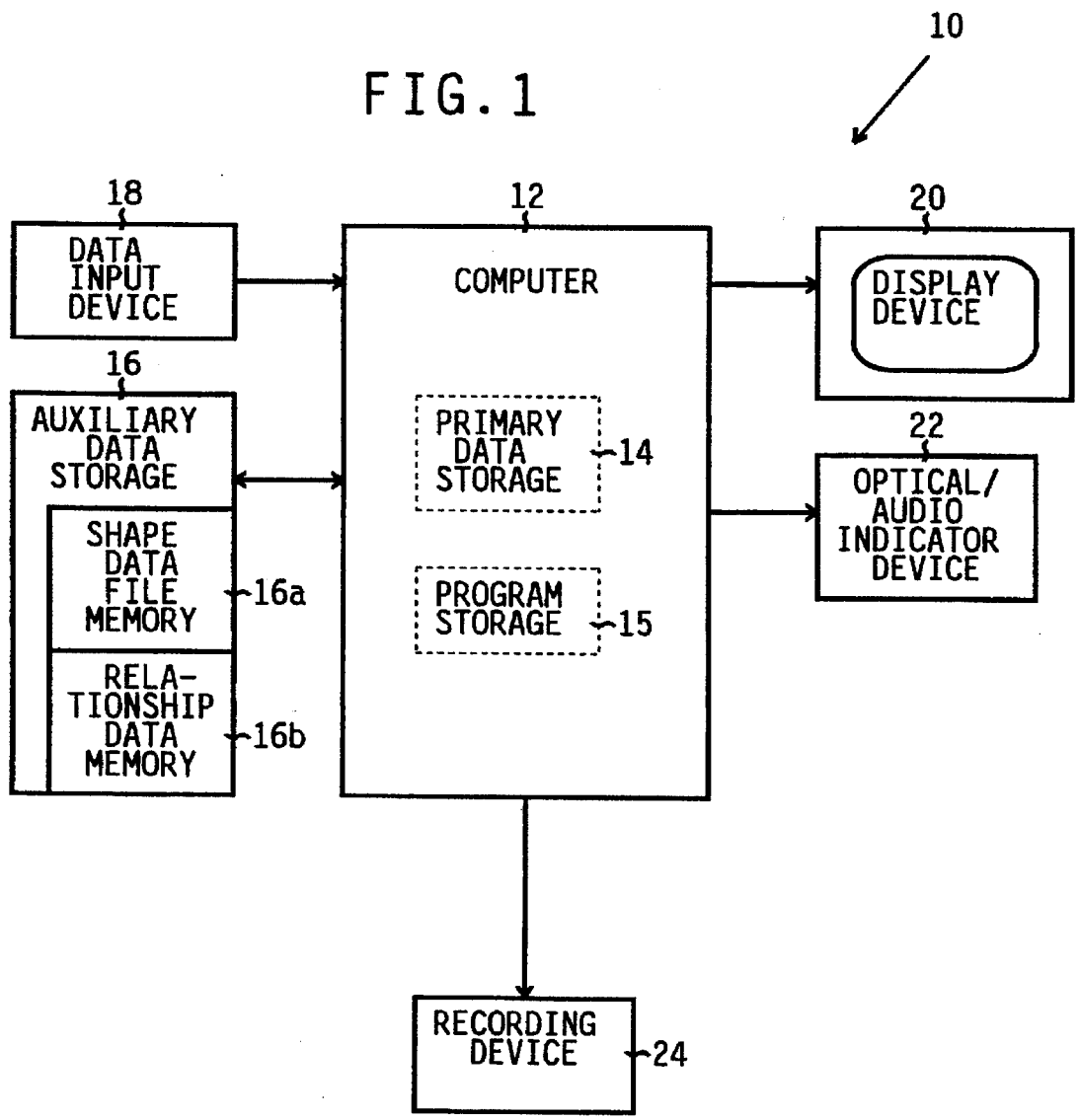
FIG. 1 is a block diagram illustrating one arrangement of a solid model generating apparatus constructed according to a first embodiment of the present invention.

Referring first to FIG. 1 showing a solid model generator 10 constructed according to one embodiment of the present invention, the solid model generator 10 uses a computer 12 which incorporates a central processing unit as well known in the art, a primary data storage 14 for storing data used in processing operations by the central processing unit, and a program storage 15 for storing system control softwares and softwares for arithmetic and logic operations performed by the central processing unit, more specifically, control programs for executing routines illustrated in FIGS. 3–11. The softwares stored in the program storage 15 include: OS software or an operating system to execute various programs; a wire frame modeler for generating wire frame models, each consisting of shape definition lines, such as edge lines, outlines or boundary lines and intersecting lines, which define the geometric characteristics of a three-dimensional solid or object; a surface modeler for generating surface models each consisting of a wire frame model and surface data relating to the surfaces of a solid; a solid modeler for generating solid models, according to appropriate algorithms such as a B-reps (Boundary Representation) process, or a CSG (Constructive Solid Geometry) process wherein a complicated shape is defined by combinations of basic or primitive solids; and other data for designing a three-dimensional object. The wire frame modeler and surface modeler are adapted to effect two-dimensional data processing to generate wire frame models and surface models, and require relatively short processing times as compared with those of the solid modeler which requires three-dimensional data processing. However, the wire frame modeler and surface modeler do not have information relating to a solid or space form.

The solid model generator 10 further includes an auxiliary data storage 16 such as a magnetic disk, a data input device 18 such as a keyboard, a display device 20 such as a cathode-ray tube, an optical/audio indicator device 22 such as a device including indicator lights, alarm lights and a speaker, and a recording device 24 such as a plotter or printer. The computer 12, which is connected to these devices 16, 18, 20, 22, 24, is adapted to generate a solid model according to the software programs stored in the program storage 15, and in response to command signals received from the data input device 18. Solid model data files representative of the thus generated solid models generated are stored in the auxiliary storage 16, and images of the solid models can be displayed on the display device 20 and reproduced by the recording device 24 on a suitable recording medium.

Figure 2:
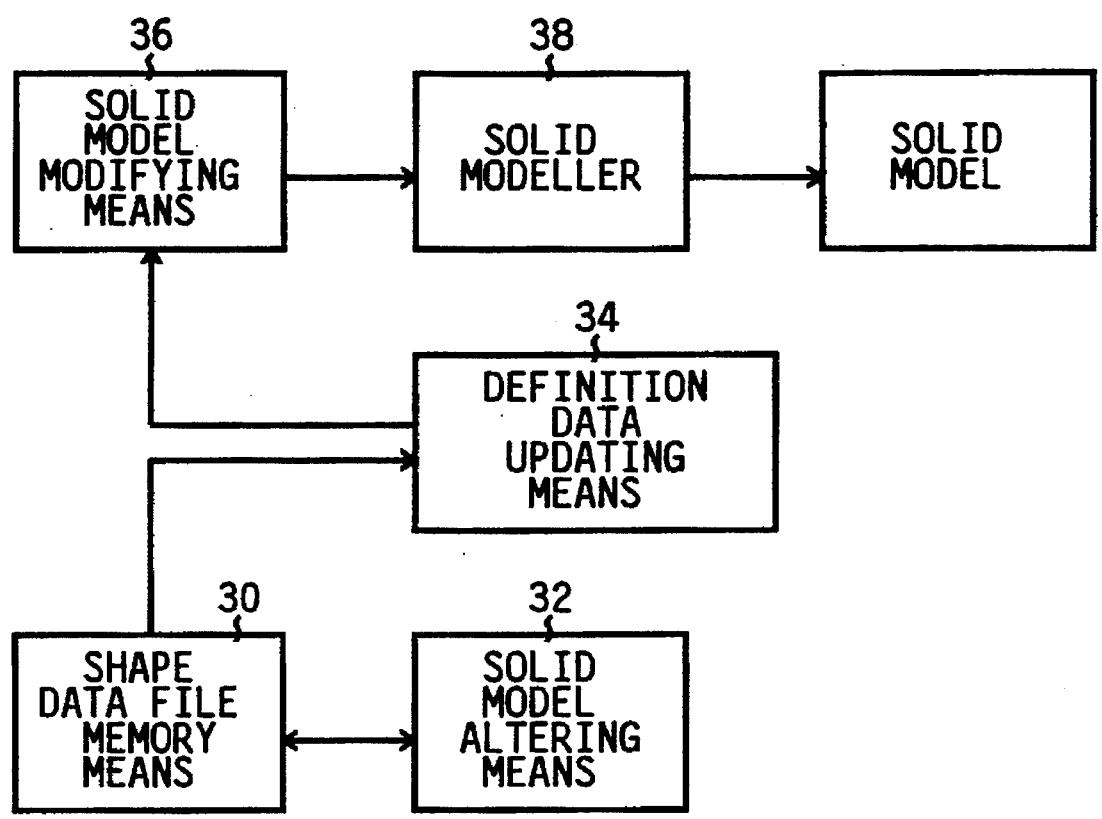
FIG. 2 is a block diagram indicating functional elements of a computer used by a solid model generator of the apparatus of the embodiment of FIG. 1.

Referring next to FIG. 2 indicating the principal functional elements of the computer 12, there will be briefly described a manner of modifying already prepared or generated solid models of components which constitute a structural assembly. The functional elements of the computer 12 include shape data file memory means 30 which corresponds to a shape data file memory 16a of the auxiliary storage 16. The shape data file memory means 30 stores a shape data file of each structural assembly, which consists of a plurality of shape data sets corresponding to the solid models of the respective components of each assembly to be generated. When the solid models of the components are modified, altering means 32 connected to the memory means 30 is operated to sequentially change the shape data sets of the components. The shape data file memory means 30 is also connected to definition data updating means 34, which is adapted to update or change the cross sectional shapes and attributes which define the original solid models of the individual components, according to the changed shape data sets and a predetermined relationship between the shape data sets and the cross sectional shapes and attributes. The changed cross sectional shapes and attributes obtained by the definition data updating means 34 are applied to solid model modifying means 36, which activates the solid modeler 38 to sequentially generate modified solid models according to the modified cross sectional shapes and attributes, whereby the solid models of the modified components of the structural assembly in question are obtained.

The shape data sets of the shape data file stored in the shape data file memory means 30 include wire frame data representative of wire frame models each consisting of shape definition lines defining a two-dimensional figure or shape. The altering means 32 is adapted to activate the display device 20 such that the wire frame models of the individual components are displayed on the screen of the device 20 in a predetermined geometric relationship with each other. The altering means 32 is responsive to command signals received from the data input device 18, to change the cross sectional shapes of the components in a predetermined procedure.

Referring to the flow charts of FIGS. 3 and 4, operations of the computer 12 will be described. The flow chart of FIG. 3 shows a main routine for generating solid models of the components of a structural assembly, while the flow chart of FIGS. 4A and 4B shows a main routine for modifying already generated or prepared solid models.

Figure 3:
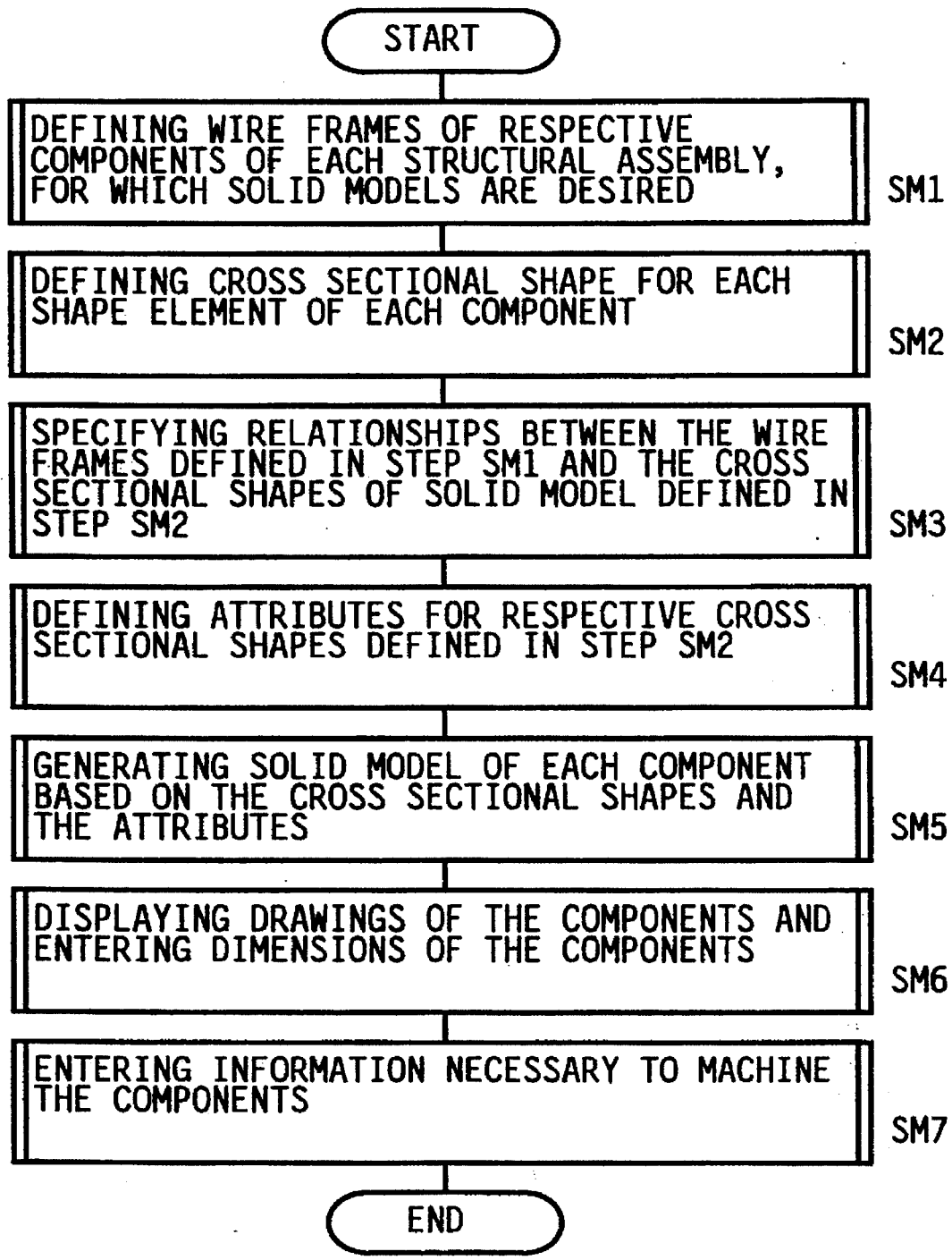
FIG. 3 is a flow chart illustrating a main routine for generating or creating solid models of a new structural assembly in the embodiment of FIG. 1.

The main routine of FIG. 3 is initiated with step SM1 to initially define wire frames of individual components of each of structural assemblies, for which the corresponding solid models are to be generated for the first time. For instance, the structural assemblies are various die sets used on a press. For instance, each die set consists of components associated with an upper die, components associated with a lower die, and other components associated with a product fabricated with these dies. The defined wire frames are stored in the shape data file memory 16a of the auxiliary data storage 16.

Figure 5:
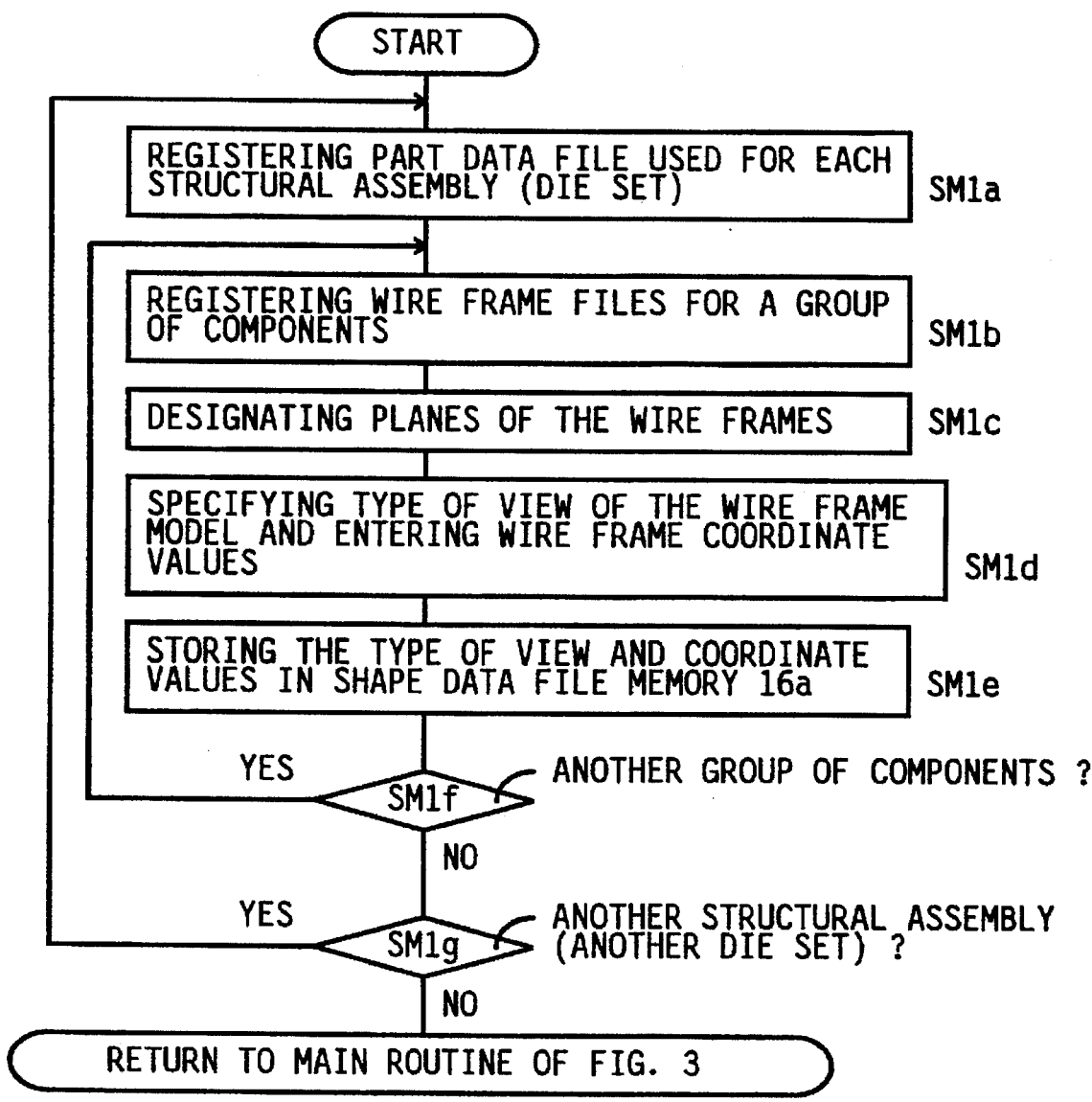
FIG. 5 is a flow chart showing an operation in step SM1 of the main routine of FIG. 3, to initially define wire frame models of components of each structural assembly for which solid models are generated.

Described in detail referring to the flow chart of FIG. 5, the step SM1 as a sub-routine is started with step SM1a to register or designate a part data file used for a given structural assembly, for example, a given die set which is newly designed and which has a specific part identification number. The part data file is registered according to command signals received from the data input device 18, in response to a data input operation by the operator through the input device 18. Step SM1a is followed by step SM1b to register wire frame files used for storing wire frame models for a group of components of the die set for which the part data file has been registered in step SM1a. For instance, the wire frame files for the components of the upper die of a die set are registered in step SM1b. This step SM1b is also effected in response to a data input operation through the data input device 18.

Then, the control flow goes to step SM1c wherein the planes in which the wire frames are defined are designated through the data input device 18. Step SM1c is followed by step SM1d in which the type of view of the wire frame model (e.g., perspective view, plan view, or front or side elevational view) and coordinate values defining the wires (coordinate values of points defining the wire lines) are entered through the data input device 18. The coordinate values are those in an x-y-z rectangular coordinate system. Step SM1e is then implemented to store the type of view and the coordinate values in the shape data file memory 16a of the auxiliary data storage 16. Step SM1e is followed by step SM1f to determine whether the structural assembly (die set) question includes another group of components, for instance, the components of the lower die, in the case where the wire frame files for the components of the upper die have been registered in step SM1b.

If an affirmative decision (YES) is obtained in step SM1f, steps SM1b through SM1e are repeated again. If a negative decision (NO) is obtained in step SM1f, the control flow goes to step SM1g to determine whether there is another structural assembly for which it is desired to newly generate the solid models and for which a part data file should be registered in step SM1a. For instance, step SM1g is implemented to determine whether there is another die set (having another part number) other than the die sets whose wire frame models have been defined and stored in steps SM1b–SM1f. If an affirmative decision (YES) is obtained in step SM1g, steps SM1a–SM1f are repeatedly implemented. If a negative decision (NO) is obtained in step SM1g, the sub-routine of FIGS. 4A and 4B is terminated.

Then, the main control flow goes to step SM2, SM3, SM4 and SM5 to enter data necessary for initial definition of the solid models of the respective components of the structural assemblies for which step SM1 has been implemented. That is, a cross sectional shape in a specified plane is defined for each shape element of each component for which the solid model is obtained, and each defined cross sectional shape is stored in the auxiliary data storage 16.

Figure 6:
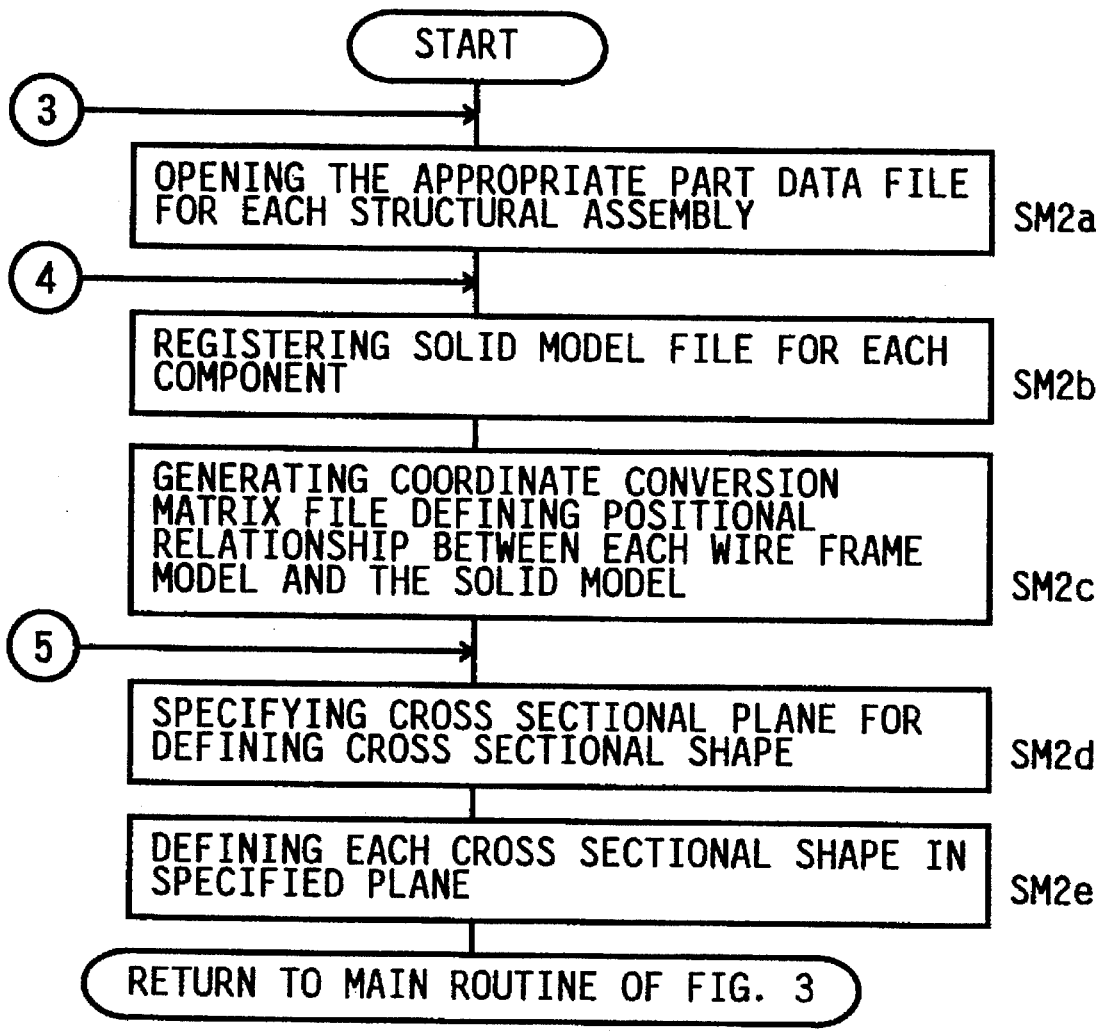
FIG. 6 is a flow chart showing an operation in step SM2 of the main routine of FIG. 3, to define a cross sectional shape of each shape element of each component.

Step SM2 (sub-routine) of the main routine of FIG. 3 will be described in detail by reference to the flow chart of FIG. 6. The sub-routine of FIG. 6 is initiated with step SM2a in which the part data file for the desired structural assembly is opened by the operator through the data input device 18. Step SM2a is followed by step SM2b to register a solid model file for each component. The control flow then goes to step SM2c to generate a coordinate conversion matrix file for defining a positional relationship between the wire frame model defined by the wire frame file and the position of the solid model defined by the solid model file. Step SM2c is followed by step SM2d wherein the cross sectional plane in which each cross sectional shape used for the solid model of each component is defined is specified according to command signal received from the data input device 18. Then, step SM2e is implemented wherein the cross sectional shape of each shape element of each component is defined in the specified cross sectional plane, according to command signals from the data input device 18.

Figure 7:
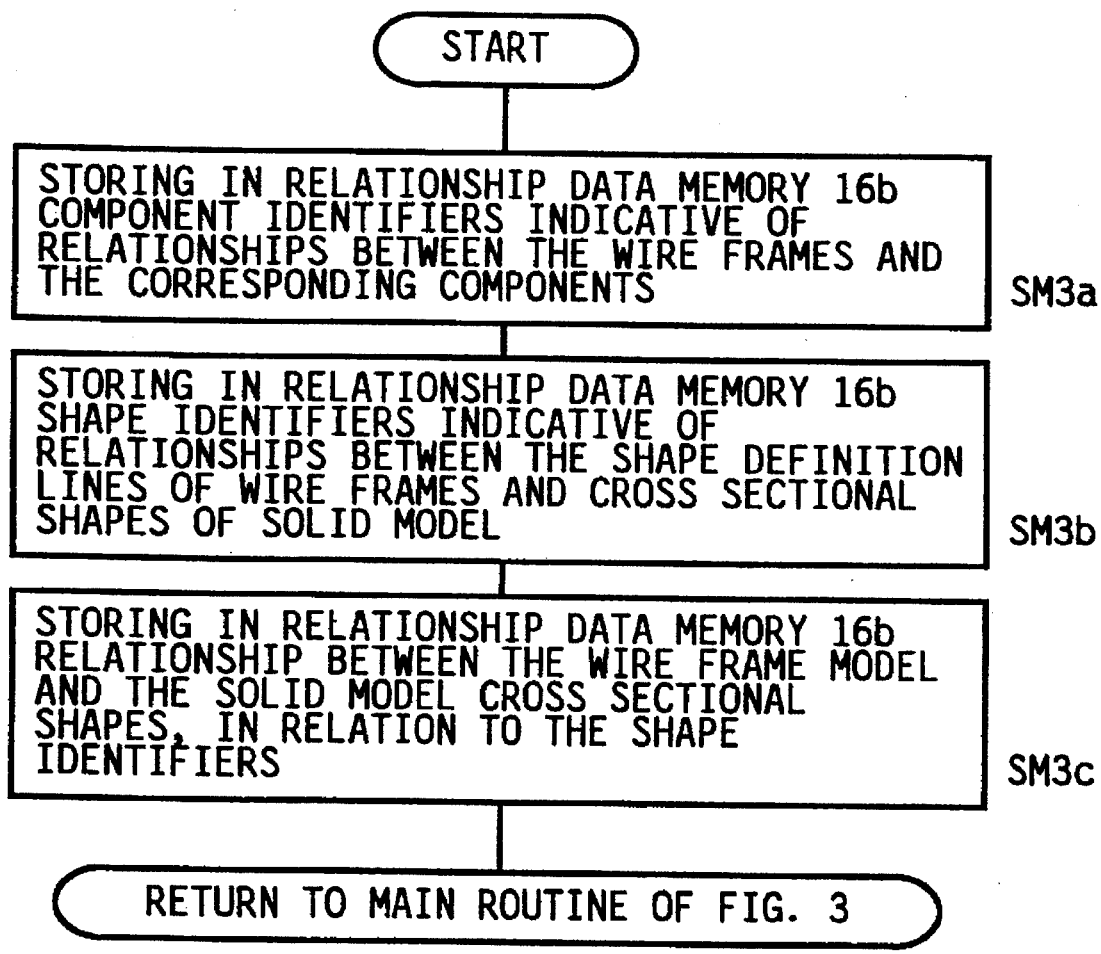
FIG. 7 is a flow chart showing an operation in step SM3 of the main routine of FIG. 3, to specify a relationship between the wire frames and the cross sectional shapes.

Step SM2 is followed by step SM3 to specify a relationship between the wire frame defined in step SM1 and the cross sectional shape of each shape element of the solid model for each component of the structural assemblies for which step SM1 has been executed. FIG. 7 shows details of the step SM3 (sub-routine) of FIG. 3.

Figure 12:
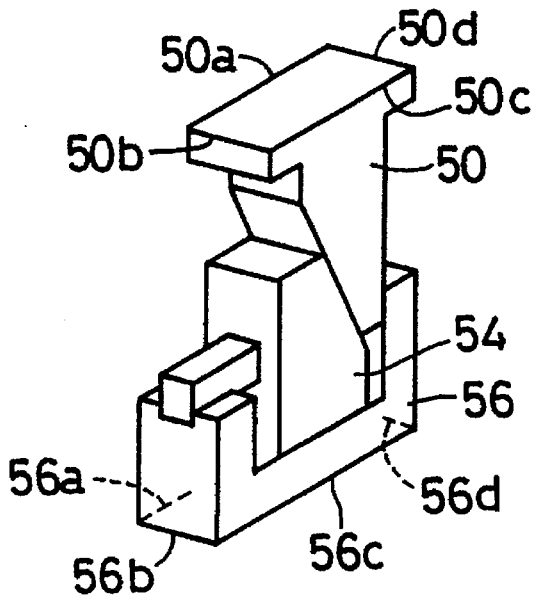
FIG. 12 is a perspective view of a structural assembly in the form of a unit cam consisting of a plurality of components, for which solid models are generated.
Figure 13:
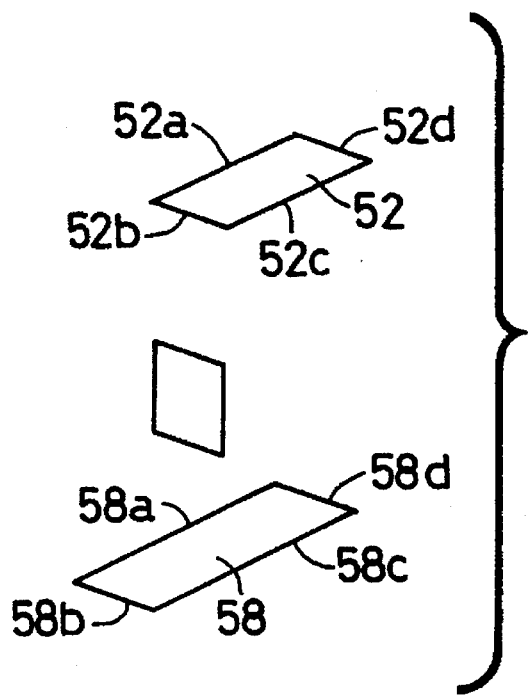
FIG. 13 is a view illustrating examples of wire frames for some components of the unit cam of FIG. 12.

The sub-routine of FIG. 7 is started with step SM3a in which component identifiers indicative of the relationships between the wire frame models and the corresponding components are stored in a relationship data memory 16b of the auxiliary data storage 16. Step SM3a is followed by step SM3b in which shape identifiers indicative of the relationship between the shape definition lines of each wire frame and the shape definition lines of each cross sectional shape used for defining each solid model are also stored in the relationship data memory 16b. The shape definition lines define each wire frame and each shape element of the solid model as explained below. Then, the control flow goes to step SM3c in which the relationship between the wire frame model and the cross sectional shapes of each solid model are stored, in relation to the shape identifiers, in the relationship data memory 16b. The relationship between the wire frame models and the solid models will be explained by reference to FIGS. 12 and 13. In the case of a structural assembly in the form of a unit cam as shown in FIG. 12, wires frames as illustrated in FIG. 13 are used in designing the unit cam. In this case, the following relationship exist between the wire frames and the cross sectional shapes and planes of the cam unit.

The cam unit shown in FIG. 12 includes an upper cam 50, a lower cam 54 slidably engaging the upper cam 50, and a base 56 for slidably supporting the lower cam 54. The upper cam 50 has shape elements including a rectangular shape of its upper end face defined by four straight shape definition lines 50a, 50b, 50c and 50d. These shape definition lines also define a plane in which the rectangular upper end face of the upper cam 50 is defined. The rectangular shape of the upper end face and the plane of this upper end face which are defined by the lines 50a–50d correspond to a wire frame in the form of a parallelogram 52 defined by four shape definition lines 52a, 52b, 52c and 52d shown in FIG. 13. Similarly, the base 56 has a shape element in the form of a rectangular shape of its lower end face (bottom surface) defined by four shape definition lines 56a, 56b, 56c, 56d, which also define a plane of the rectangular lower end face. The rectangular shape of the lower end face and the plane of this lower end face which are defined by the lines 56a–56d correspond to a wire frame in the form of a parallelogram 58 defined by four shape definition lines 58a, 58b, 58c and 58d shown in FIG. 13.

Step SM3 is followed by step SM4 in which an attribute for each cross sectional shape defined in step SM2 is defined for generating the solid model of each component. The attribute is defined according to command signals from the data input device 18. The control flow then goes to step SM5 in which the solid modeler 38 is operated to generate the solid model of each component on the basis of the cross sectional shapes defined in step SM2 and the attributes given to these cross sectional shapes in step SM4. These steps SM4 and SM5 will be described in detail by reference to the flow chart of FIG. 8.

Initially, step SM4a is implemented to specify the type of each geometric feature of each component, according to command signals received from the data input device 18. The geometric features of the components include projections, cutouts, curved surfaces and other structural characteristics. Step SM4a is followed by step SM4b to specify the method of creating a solid by translating or otherwise moving the plane of each cross sectional shape defined in step SM2. For instance, pushing, rotation, sweeping and blending are available for moving the plane. This step SM4b is effected according to command signals received from the data input device 18. Step SM4b is followed by step SM4c in which the direction of generating each geometric feature is specified through the data input device 18. Then, step SM4d is implemented to specify the type of ending of each geometric feature through the data input device 18. For example, an end of a geometric feature is determined by a wire frame or a predetermined dimension, line or plane, or a geometric feature has an open end or is a through-hole. Thus, the type of the geometric feature, method of moving the cross sectional plane, direction of generating the geometric feature and the type of ending of the geometric feature are considered to constitute an attribute given to each cross sectional shape defined in step SM2, which attribute is required to specify or define the geometric characteristics of each component as a solid structure.

Step SM4d is followed by step SM4e to determine whether a wire frame has been specified in step SM4d as an element determining an end of a geometric feature. If an affirmative decision (YES) is obtained in step SM4e, step SM3d is implemented to store in the relationship data memory 16b a relationship between the specified wire frame and the relevant end of the geometric feature. Step SM3d is followed by step SM5a. If a negative decision (NO) is obtained in step SM4e, step SM5a is implemented without step SM3d being implemented.

Figure 8:
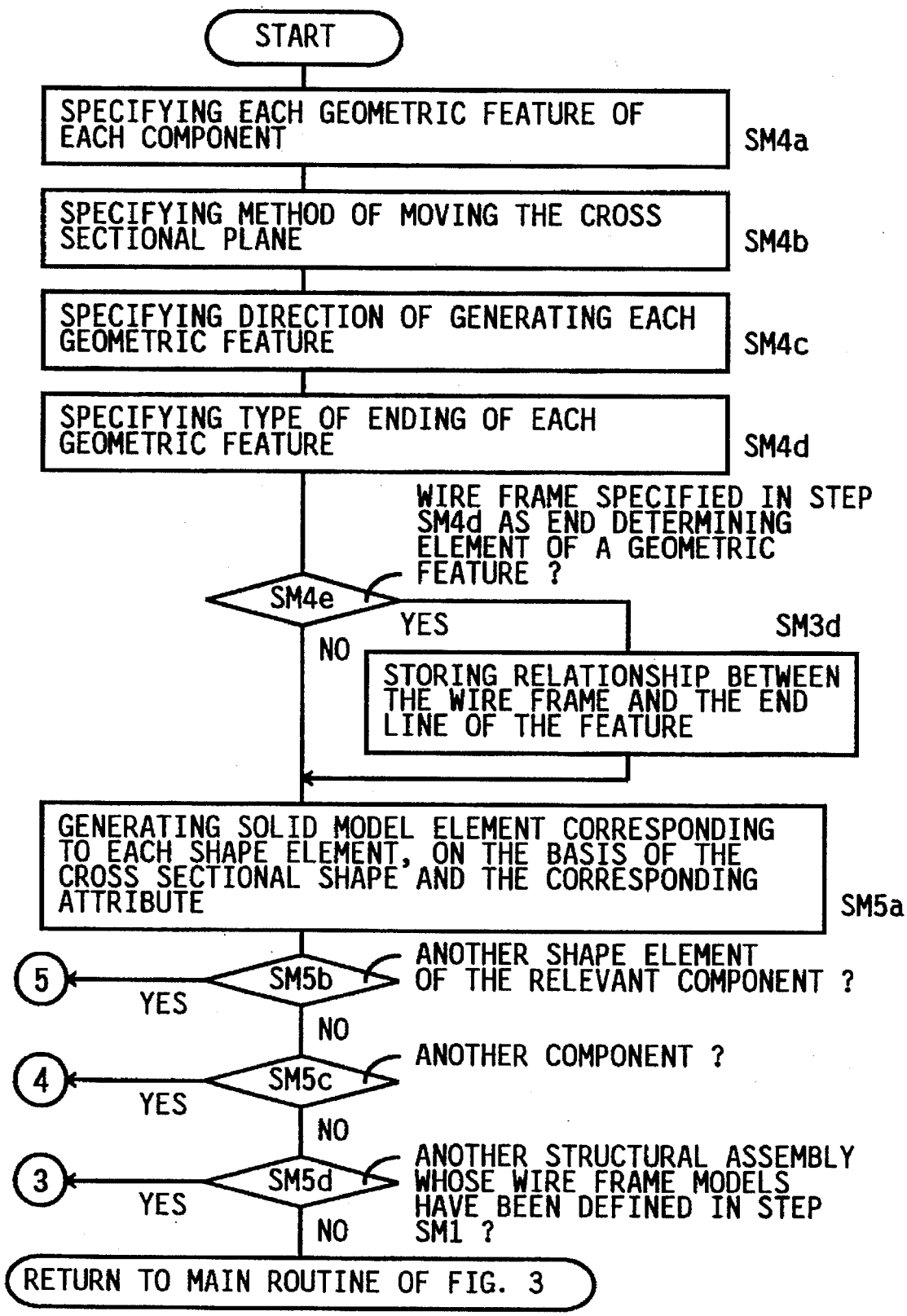
FIG. 8 is a flow chart showing an operation in step SM4 of the main routine of FIG. 3, to give an attribute to each cross sectional shape of the component, and an operation in step SM5 of the main routine to generate the solid model on the basis of the cross sectional shapes and the attributes.

Step SM5a is implemented to generate a solid model element corresponding to each shape element of the relevant component, for which the cross sectional plane and shape have been defined in steps SM2d and SM2e, and for which the attribute has been defined in steps SM4a–SM4e. The solid model element which partially defines or constitutes a part of the solid model of the component is generated by the solid modeler 38 (software stored in the program storage 15) on the basis of the cross sectional shape and the corresponding attribute. Step SM5a is followed by step SM5b to determine whether the relevant component has another shape element to be defined. If an affirmative decision (YES) is obtained in step SM5b, the control flow goes back to step SM2d (FIG. 6) to implement this step and the following steps, to thereby generate the solid model element of that shape element. If a negative decision (NO) is obtained in step SM5b, step SM5c is implemented to determine whether the relevant structural assembly has another component. If an affirmative decision (YES) is obtained in step SM5c, the control flow goes back to step SM2b (FIG. 6) to implement this step and the following steps, to thereby generate the solid model of that component. If a negative decision (NO) is obtained in step SM5c, the control flow goes to step SM5d to determine whether there is another structural assembly whose part data file has been registered in step SM1 of the main routine of FIG. 3. If an affirmative decision (YES) is obtained, the control flow goes back to step SM2a (FIG. 3) and implement this step and the following steps, to thereby generate the solid model of each component of that structural assembly. If a negative decision (NO) is obtained in step SM5d, the sub-routine of FIG. 8 is terminated, and the control flow goes to step SM6 of the main routine.

In step SM6, data necessary to draw the components are generated according to the solid models which have been generated in step SM5. That is, the drawings of the components are displayed on the screen of the display device 20, and necessary dimensions of the lines defining the components are entered through the data input device 18 and stored in the auxiliary data storage 16. The operation in step SM6 will be described in detail by reference to the flow chart of FIG. 9.

Figure 9:
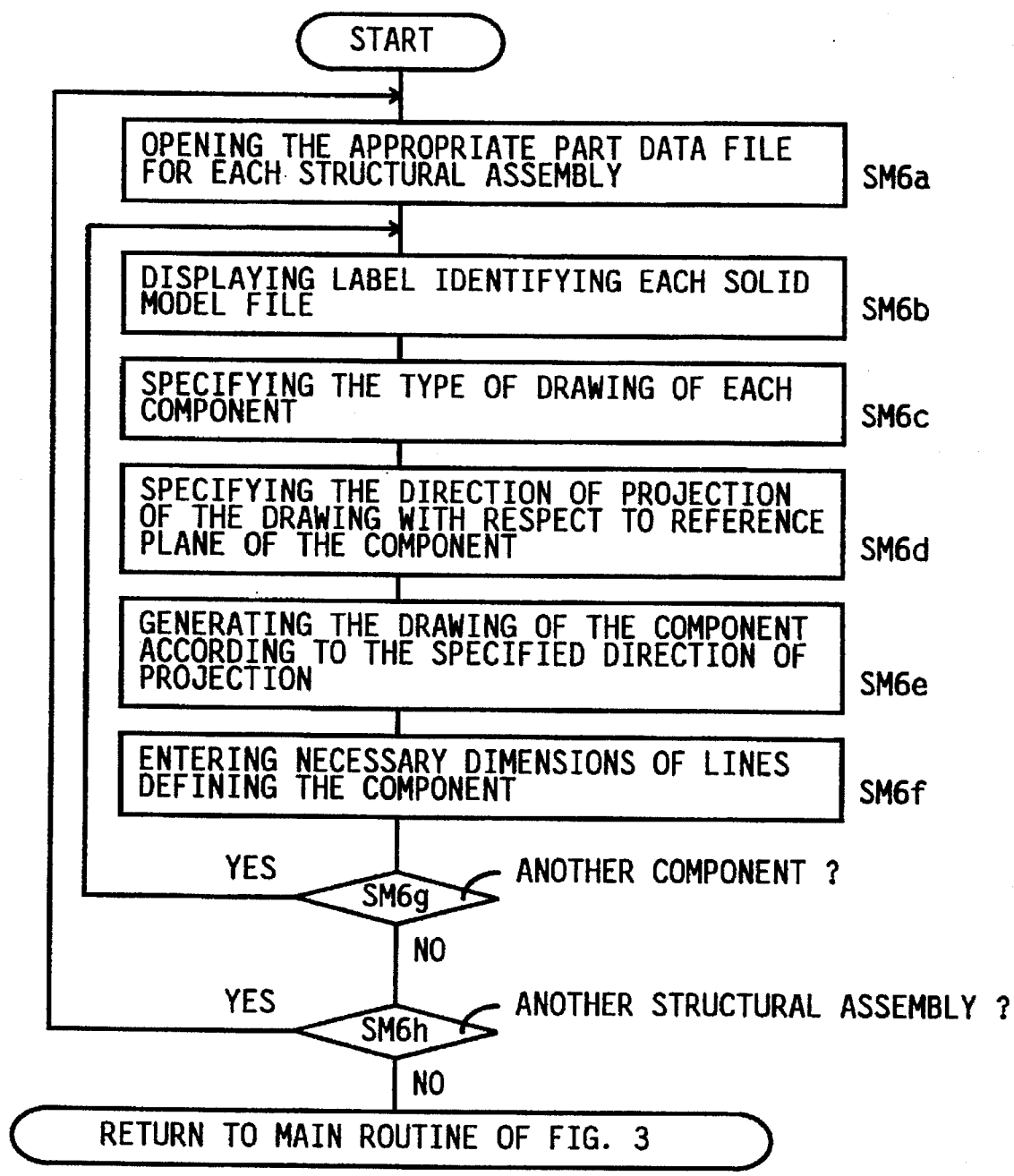
FIG. 9 is a flow chart showing an operation in step SM6 of the main routine of FIG. 3, to display the drawing of each component according to the generated solid model and enter and store the dimensions of the component in the drawing.

The sub-routine of FIG. 9 is initiated with step SM6a to open the appropriate part data file for each structural assembly. Step SM6a is followed by step SM6b in which a label identifying the solid model file is displayed on the display device 20. Then, step SM6c is implemented to specify the type of drawing of the component through the data input device 18. Step SM6c is followed by step SM6d in which the direction of projection of the drawing with respect to a reference plane of the drawing is specified through the data input device 18. Then, the control flow goes to step SM6e in which the drawing of the component is generated according to the specified direction of projection. Step SM6e is followed by step SM6f in which the necessary dimensions of the lines defining the component are entered through the data input device 18 and stored. Step SM6g is then implemented to determine whether the structural assembly in question has another component. If an affirmative decision (YES) is obtained in step SM6g, the control flow goes back to step SM6b and implement this step and the following steps. If a negative decision (NO) is obtained in step SM6g, the control flow goes to step SM6h to determine whether there is another structural assembly. If an affirmative decision (YES) is obtained in step SM6h, the control flow goes back to step SM6a and implement this step and the following steps. If a negative decision (NO) is obtained in step SM6h, the sub-routine of FIG. 9 is terminated, and the control flow goes to step SM7 of the main routine of FIG. 3.

In step SM7, information necessary to machine or manufacture the components whose solid models have been generated in step SM5 are entered through the data input device 18. The operation in this step SM7 will be described in detail referring to the flow chart of FIG. 10.

Figure 10:
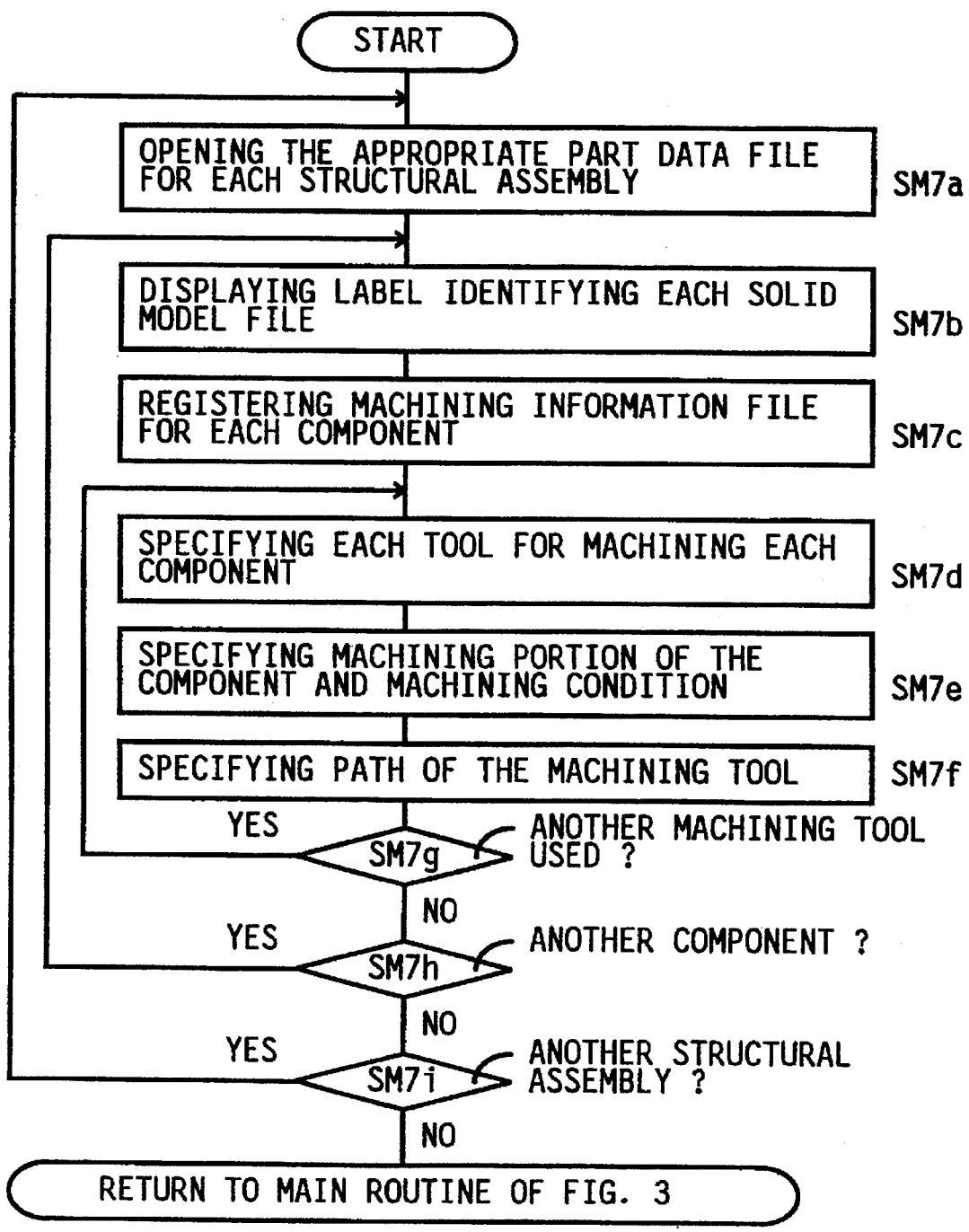
FIG. 10 is a flow chart showing an operation in step SM7 of the main routine of FIG. 3 to enter and store information necessary to machine the components.

The sub-routine of FIG. 10 is initiated with step SM7a to open the appropriate part data file for each structural assembly. Step SM7a is followed by step SM7b in which a label identifying each solid model file is displayed on the display device 20. Then step SM7c is implemented to register a machining information file for each component through the data input device 18. Then, the control flow goes to step SM7d in which each tool used for machining the component is specified through the data input device 18. Step SM7d is followed by step SM7e in which a portion of the component to be machined by the tool and the machining condition are specified through the data input device 18. Step SM7f is then implemented to specify a path to be taken by the machining tool, through the data input device 18. Then, the control flow goes to step SM7g to determine whether there is another tool used to machine the component. If an affirmative decision (YES) is obtained, steps SM7d–SM7g are repeated. If a negative decision (NO) is obtained in step SM7g, step SM7h is implemented to determine whether the structural assembly in question has another component. If an affirmative decision (YES) is obtained in step SM7g, steps SM7b–SM7g are repeated. If a negative decision (NO) is obtained in step SM7h, the control flow goes to step SM7i to determine whether there is another structural assembly. If an affirmative decision (YES) is obtained in step SM7i, the control flow goes to step SM7a to repeat steps SM7b–SM7h. If a negative decision (NO) is obtained in step SM7i, the sub-routine of FIG. 10 or step SM7 of the main routine is terminated, whereby the main routine is terminated.

Figure 4A:
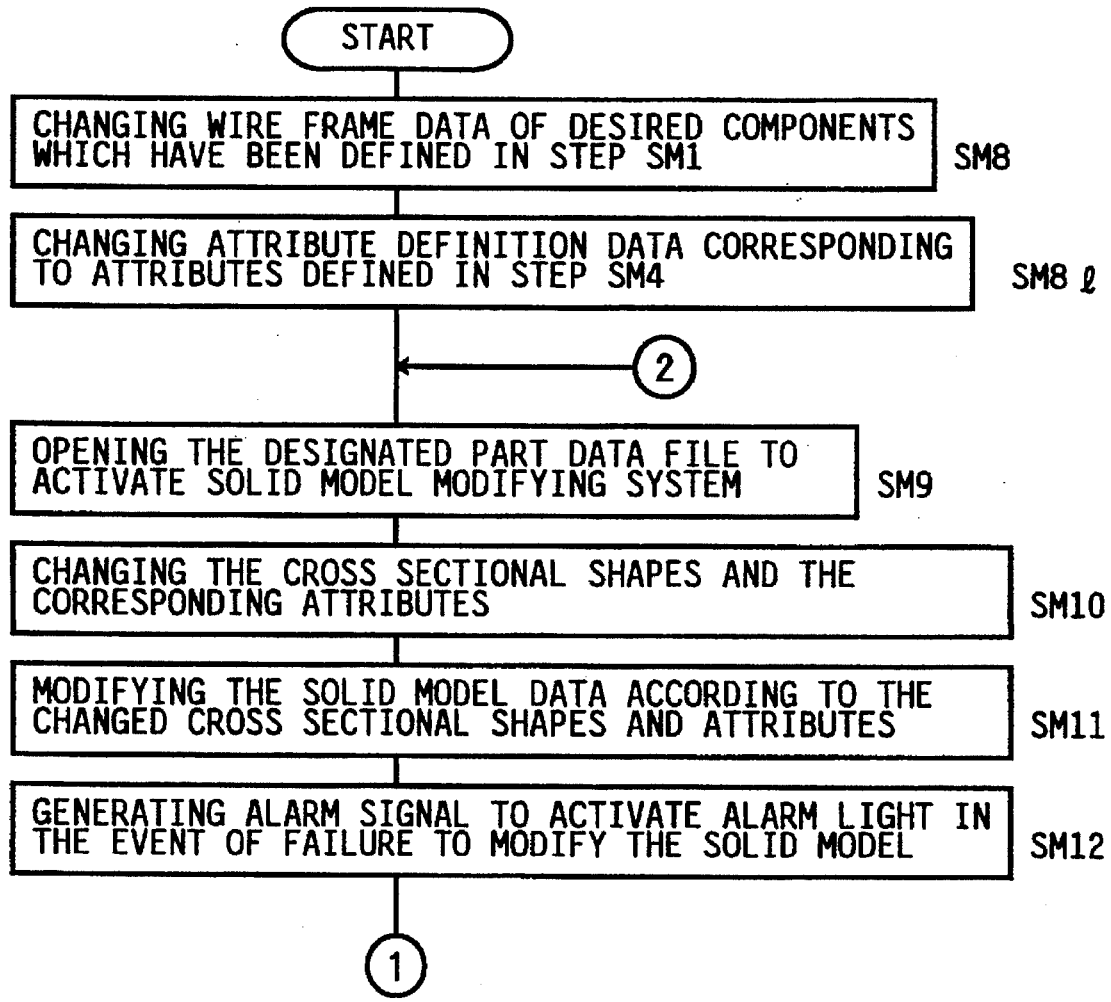
FIGS. 4A and 4B are flow charts illustrating a main routine for modifying solid models already generated by the solid model generator according to the main routine of FIG. 3.
Figure 4B:
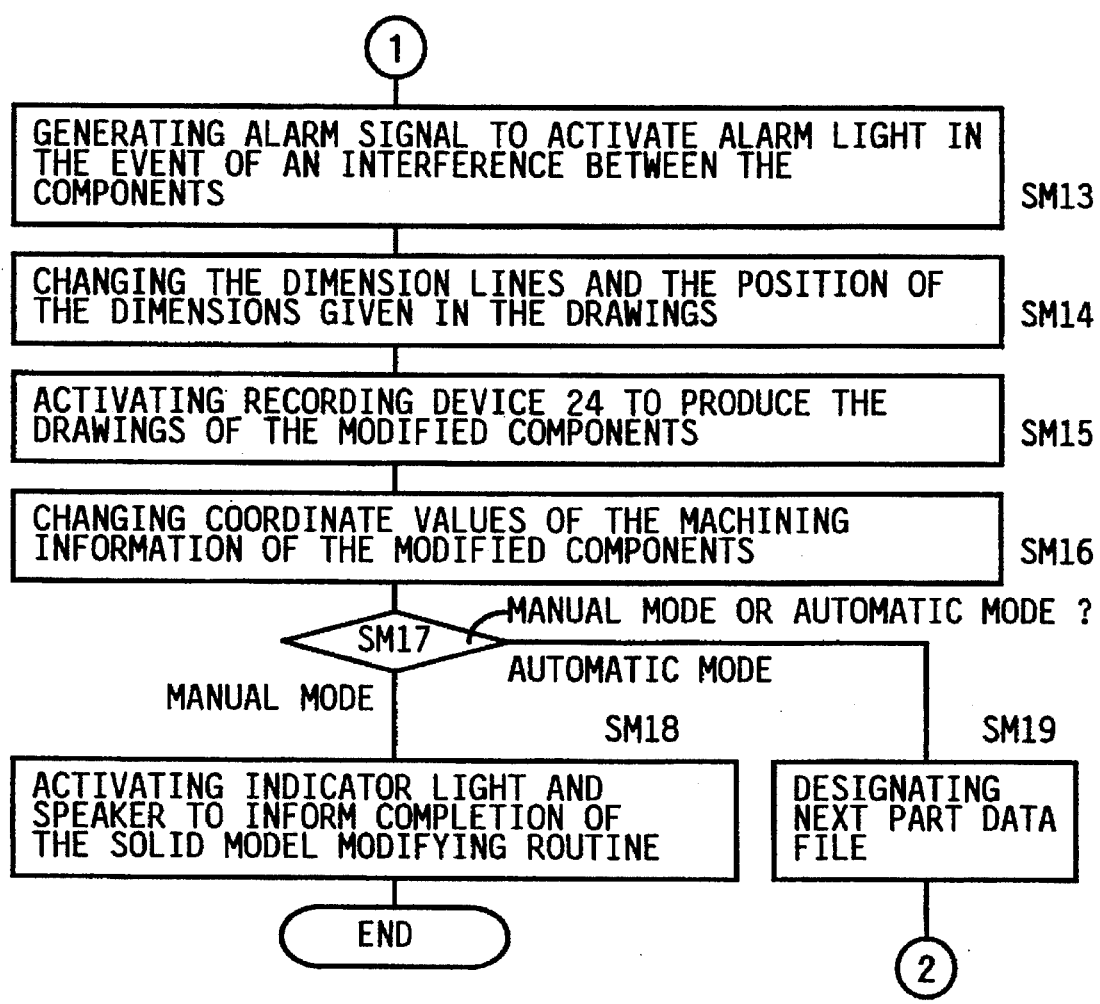

If it is desired to modify or change the solid model or models of a certain component or components which have been generated in step SM5 of the main routine of FIG. 3 as described above, the solid models may be modified according to the main routine of FIGS. 4A and 4B which is formulated to modify the already generated solid models. The main routine of FIGS. 4A and 4B is initiated with step SM8, which corresponds to the altering means 32 illustrated in FIG. 3. In step SM8, the wire frame models of the appropriate structural assembly are displayed on the display device 20, and the operator is allowed to enter and store data necessary to modify the desired component or components, more specifically, data necessary to change the shape (and dimensions) or position of the component or components. The flow chart of FIG. 11 shows details of an operation in step SM8.

Figure 11:
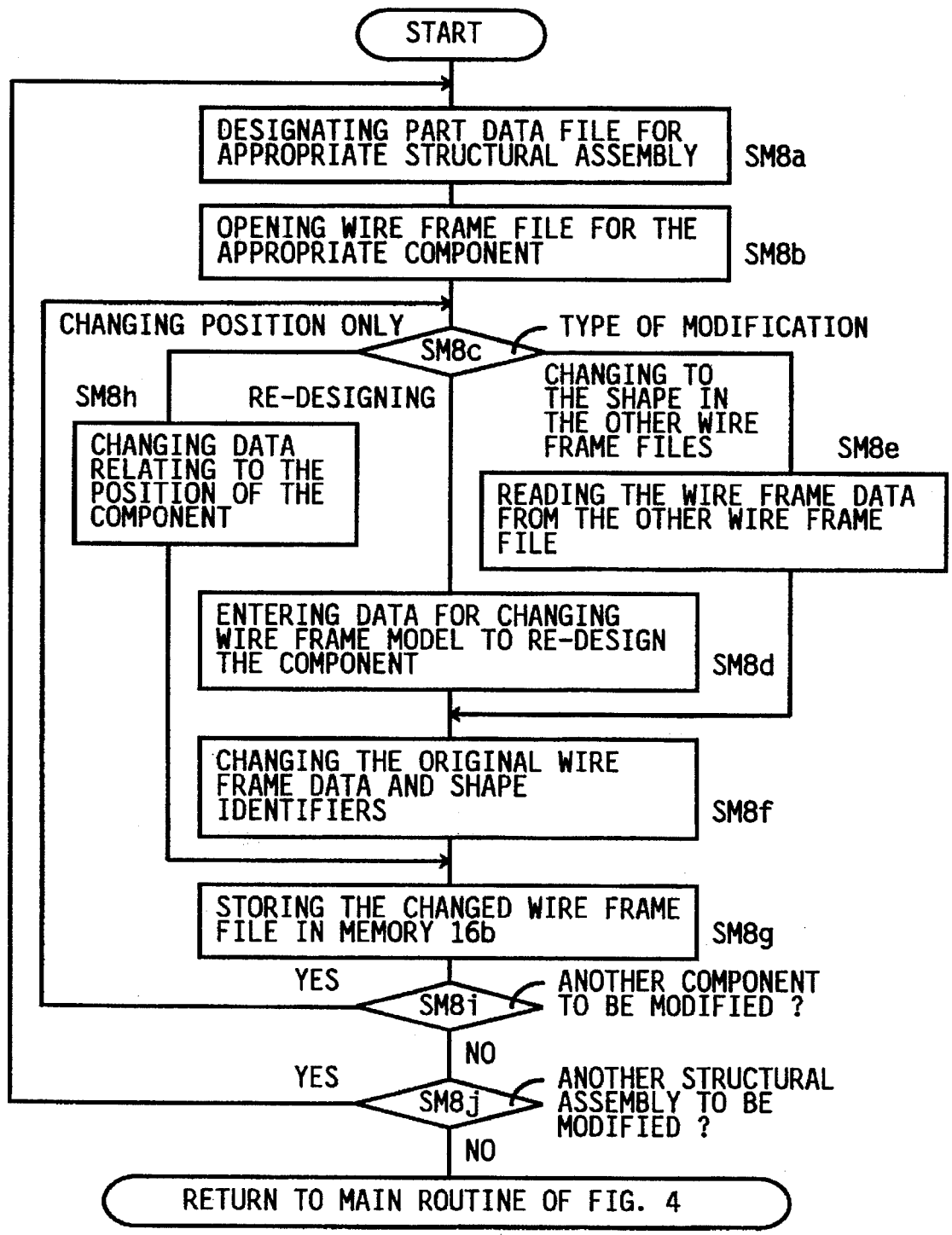
FIG. 11 is a flow chart showing an operation in step SM8 of the main routine of FIGS. 4A and 4B to change the wire frame models of the desired components.

The sub-routine of FIG. 11 is started with step SM8a to designate the part data file for the appropriate structural assembly whose component or components is/are modified in design. Step SM8b is then implemented to open the wire frame file for each component to be modified. More specifically, the wire frame file is read out from the shape data file memory 16a of the auxiliary data storage 16, in response to a signal received from the data input device 18, and the appropriate wire frame models are displayed on the display device 20. Then, the control flow goes to step SM8c to determine which one of the following three types of modification is required by the operator: changing only the position of the appropriate component; changing the shape of the component or re-designing the component; and replacing the shape of the component by that of the other component whose wire frame model is stored in the other wire frame file.

If the operator specifies the modification by re-designing the component (changing the shape and dimensions of the component), the control goes to step SM8d wherein the operator enters data necessary to change the shape of the component through the data input device 18, while the original wire frame model is displayed on the display device 20. Step SM8f is then implemented to change the original wire frame data and shape identifiers. Step SM8f is followed by step SM8g to store the changed wire frame file in the shape data file memory 16a. If the operator specifies the modification by copying the wire frame data in the other wire frame file (for the other component), step SM8c is followed by step SM8e in which the wire frame data are read from the other wire frame file. Then, the original wire frame data and shape identifiers are changed in step SM8f, and the changed wire frame file is stored in the memory 16a. If the modification by changing only the position of the component in question, step SM8c is followed by step SM8h in which the data relating to the position of the component are changed, and step SM8g is implemented to store the changed wire frame file in the memory 16a.

After the wire frame data in the wire frame file for the appropriate component have been changed or modified, step SM8i is implemented to determine whether the structural assembly in question has another component to be modified. If an affirmative decision (YES) is obtained in step SM8i, steps SM8c-SM8g are repeated for that component. If a negative decision (NO) is obtained in step SM8i, the control flow goes to step SM8j to determine whether there is another structural assembly to be modified. If an affirmative decision (YES) is obtained in step SM8j, steps SM8a-SM8i are repeatedly implemented. IF a negative decision (NO) is obtained in step SM8j, the sub-routine of FIG. 11 is terminated.

In the auxiliary data storage 16, attribute definition data corresponding to the attributes defined in step SM4 are stored for each of the wire frame models of the components. In step SM8l following step SM8, the attribute definition data are changed through the data input device 18, in accordance with the modification of the wire frame data in step SM8. The attribute definition data may be changed as needed even when the corresponding wire frame data have not been changed. This step SM8l also corresponds to the altering means 32 illustrated FIG. 2.

Step SM8l is followed by step SM9 to open the part data file designated in step SM8a, for thereby activating a solid model modifying system. Step SM9 is followed by step SM10 in which the cross sectional shapes defining each solid model of the component whose wire frame data have been modified in step SM8 are modified according to the wire frame data modified in step SM8 and the relationship data obtained in step SM3. Further, the attributes defined in step SM4 are changed according to the attribute definition data changed in step SM8l and a predetermined relationship between the attribute definition data and the attributes to be changed. The present step SM10 corresponds to the definition data updating means 34 of FIG. 2. Then, the control flow goes to step SM11 in which the solid model data of each component whose wire frame data have been changed are modified by the solid modeler 38 on the basis of the cross sectional shapes and attributes changed in step SM10, in a predetermined three-dimensional solid modelling procedure. Namely, a new solid model corresponding to the changed wire frame data is generated and stored in the auxiliary data storage 16. The present step SM11 corresponds to the solid model modifying means 36 of FIG. 2, which operates according to the solid model definition data in the form of the cross sectional shapes and attributes changed by the definition data updating means 34.

Step SM12 is then implemented to generate an alarm signal to activate an alarm indicator light of the optical/audio indicator device 22, in the event that the solid modeler 38 fails to generate a solid model on the basis of the cross sectional shapes and attributes which have been changed in step SM10. The activation of the alarm indicator light prompts the operator to take a suitable measure to remove this erroneous state of the solid model generator 10. Step SM13 is then implemented to check if there is an interference between the modified components. If such interference exits due to entry of erroneous data to change the wire frame models (shape and dimensions of the components) in step SM8, an alarm signal is generated to activate the alarm indicator light of the indicator device 22. The activation of the indicator light prompts the operator to correct the erroneous data entry.

Step SM13 is followed by step SM14 in which the positions of the dimension lines and the positions of the dimension values in the drawings of the components are changed according to the solid models modified in step SM11. Step SM15 is then implemented to activate the recording device 24 to produce the drawing of each modified component, and the drawing of the structural assembly which includes the modified component or components. Step SM15 is followed by step SM16 to change the coordinate values of the machining information of the components according to the modified solid models. The control flow then goes to step SM17 to determine whether the routine of FIGS. 4A and 4B is executed in a manual mode or an automatic mode. In the manual mode, steps SM9 through SM16 are implemented only once each time the appropriate part data file corresponding to each structural assembly is designated by the operator through the data input device 18. In the automatic mode, steps SM9-SM16 are repeatedly implemented for all of the structural assemblies whose wire frame data have been changed in step SM8.

If the manual mode is selected, step SM17 is followed by step SM18 in which the indicator light and speaker of the indicator device 22 are activated to inform the operator of the completion of the solid model modifying routine of FIGS. 4A and 4B. It is noted that step SM18 is implemented also when steps SM9-SM16 have been repeatedly implemented for all of the structural assemblies whose wire frame data have been changed in step SM8. Namely, step SM17 is followed by step SM18 when the step SM17 is implemented after the last part data file is designated in step SM19 in the automatic mode.

If the automatic mode is selected, step SM17 is followed by step SM19 in which the next part data file is designated, and steps SM9-SM16 are automatically implemented again, as indicated above. Steps SM9-SM16 are repeatedly implemented until the solid models of all the structural assemblies to be modified have been modified.

It will be understood from the foregoing description of the present embodiment that the solid models of two or more components can be modified by simply changing the shape data in the form of the wire frame data stored in the shape data file memory means 30. Described more specifically, the shape data are changed by the altering means 32 according to data entry operations through the data input device 18. Then, the definition data updating means 34 is automatically operated to change the cross sectional shapes and the corresponding attributes on the basis of the shape data changed by the altering means 32, according to the predetermined relationship between the changed shape data and the cross sectional shapes and attributes to be changed. The changed cross sectional shapes and attributes are applied to the solid model modifying means 36, as solid model definition data which define the solid models. The solid model modifying means 36 activates the solid modeler 38 so that the original solid models are modified according to the solid model definition data in the form of the changed cross sectional shapes and attributes. Thus, the means 30, 32, 34, 36 and solid modeler 38 constitute a solid model modifying apparatus capable of modifying already prepared solid models of two or more components of a structural assembly.

In the present embodiment, the operator simply enters data necessary to change the shape data or wire frame data stored in the shape data file memory means 30, at one time for all the components whose solid models are to be modified. Then, the corresponding cross sectional shapes and attributes necessary to define the solid models are automatically changed according to the changed wire frame data, and the solid models of all the components whose wire frame data have been changed are automatically modified by the solid modeler 38 according to the changed cross sectional shapes and attributes. Thus, the modification of the solid models on the basis of the changed wire frame data does not require the attendance of the operator or designer, and can be performed at night. Accordingly, the operator does not have to wait at the peripheral data input device of the solid model generating system, whereby the time required for the operator to attend the system can be reduced to less than a half of the conventional requirement, and the component designing efficiency is accordingly improved.

In the present embodiment, the shape data stored in the shape data file memory means 30 take the form of shape definition lines (as indicated at 52a–52d in FIG. 13) representative of wire frames which are two-dimensional figures. The wire frame models of two or more components of a structural assembly are displayed on the display device 20 at one time, so as to facilitate changing of the wire frame data, that is, changing of the shape definition lines defining the wire frames which correspond to the cross sectional shapes of the components or solid models. Generally, the dimensional or geometric modification of two or more components of a structural assembly requires the designer to consider the compatibility of the modified components with respect to each other and with respect to the non-modified components, in terms of their attachment or connection to or engagement with each other or their dimensional coordination. In some cases, the designer is required to re-modify the component or components so as to correct or overcome defects or incompatibility of the modified and non-modified components in a trial-and-error fashion. In the present embodiment, the dimensional and positional compatibility or coordination of the two or more components can be readily checked while the wire frame models are displayed on the same screen of the display device 20, even if the wire frame models are changed by the altering means 32 two or more times. Further, each component is initially defined by two-dimensional figures or wire frames (wire frame model), which can be processed at a higher speed than in the conventional system in which the three-dimensional data processing is required for modifying the solid model of each component. Therefore, the present arrangement permits designing or modification of the components with improved efficiency and reduced time of repeated processing in the trial-and-error fashion.

In addition, the present arrangement does not require an expensive high-speed computer for successively modifying the solid models of two or more components on the basis of the changed wire frame data, since the system need not be attended by the operator and does not impose a waiting time on the operator. In other words, the present system can be operated with an inexpensive low-speed computer, and is available at an accordingly reduced cost.

The present embodiment is also advantageous in that the coordination of the components of a structural assembly can be checked by the wire frame models, thereby making it possible to minimize the possibility of problems which would occur with the solid models generated at the later stage of processing.

Further, the design management of the various components in the form of the wire frame data assures reduced error of designing of the components, and enhanced quality control of the components produced.

In the present system wherein a structural assembly as a whole is designed in the form of wire frame models, source materials used for defining the wire frames or wire frame models can be used for checking the designed structural assembly for adequacy. Conventionally, such materials are not kept and cannot be used later to re-design the designed components or design related components. In this respect, the present system assures higher designing efficiency that the conventional system.

In the conventional system, the solid models as illustrated in FIG. 12 are displayed when the corresponding components are modified, for example, when the standardized components having standard shapes are modified in relative position. In the present system, however, sketches or simple drawing figures equivalent to the wire frames as illustrated in FIG. 12 are displayed when the components are modified. Accordingly, the required time for re-designing the components is accordingly reduced in the present system.

As indicated above, a die set used on a press is an example of structural assemblies whose wire frame data are stored in the shape data file memory 16a of the auxiliary data storage 16 (shape data file memory means 30). In this case, the wire frame models may be designed for a group of components associated with an upper die, a group of components associated with a lower die, and a group of components associated with a product produced by the die set. For improving the coordination between the components, it is desirable to correlate the commonly used components of those groups, so that different operators of the system or different designers may design such structural assemblies so as to meet the same design concept.

In the above embodiment, sets of wire frame data representative of wire frame models of respective components are stored in the memory means 30 and are modified in step SM8 to modify the corresponding solid models. However, the wire frame models may be replaced by surface models or may be used to generate the surface models, which are used to generate the solid models.

Figure 14:
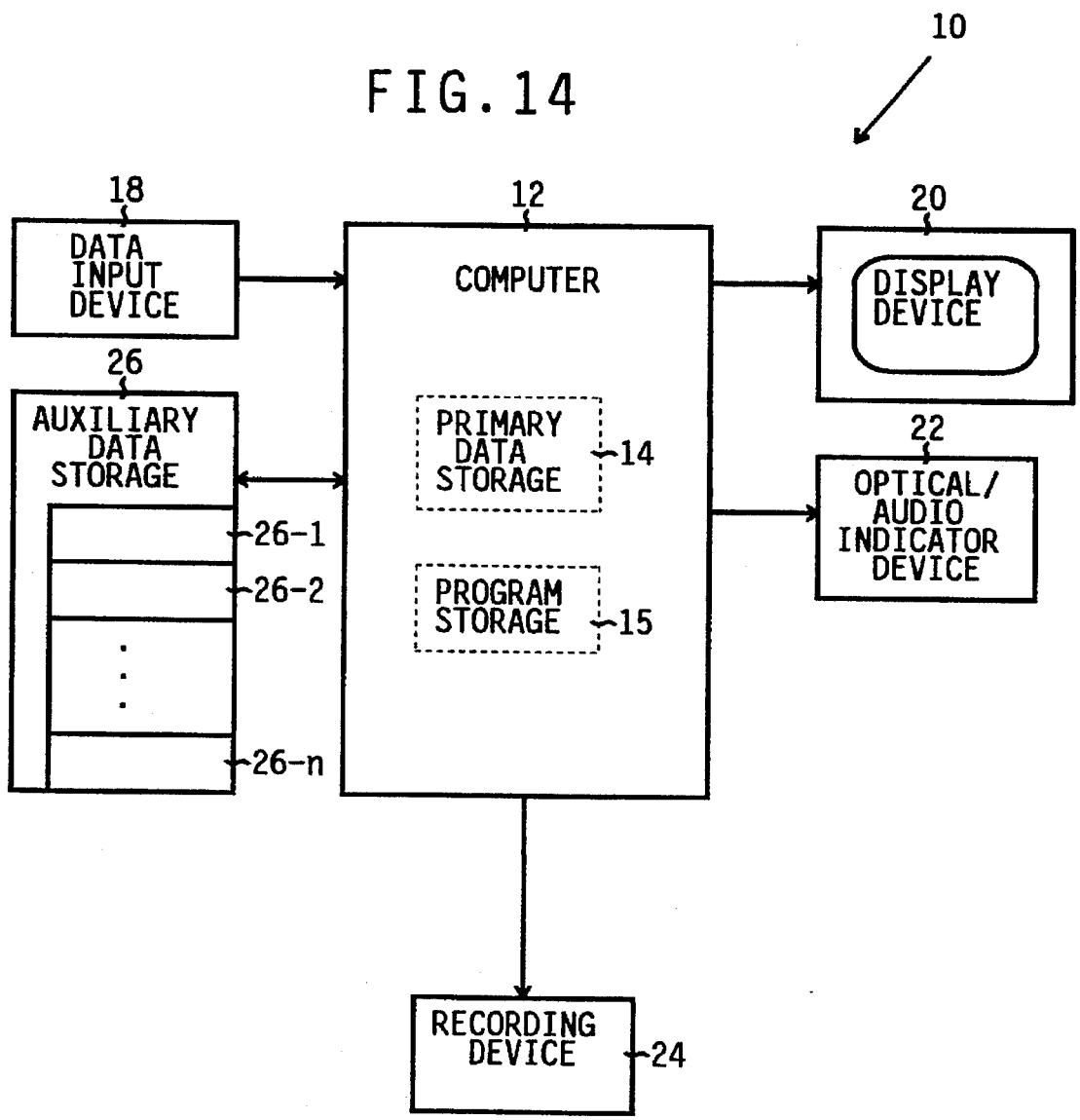
FIG. 14 is a view corresponding to that of FIG. 1, showing an arrangement of a solid model generating apparatus constructed according to a second embodiment of this invention.

Referring next to FIGS. 14–21, there will be described a second embodiment of the present invention. While the program storage 15 in the first embodiment of FIG. 1–11 stores the control programs for executing the routines of FIGS. 3–11, the program storage 15 in the present embodiment stores control programs for executing routines illustrated in FIGS. 17–21. Further, the present apparatus uses an auxiliary data storage 26 in place of the auxiliary data storage 16, as indicated in FIG. 14.

Figure 16:
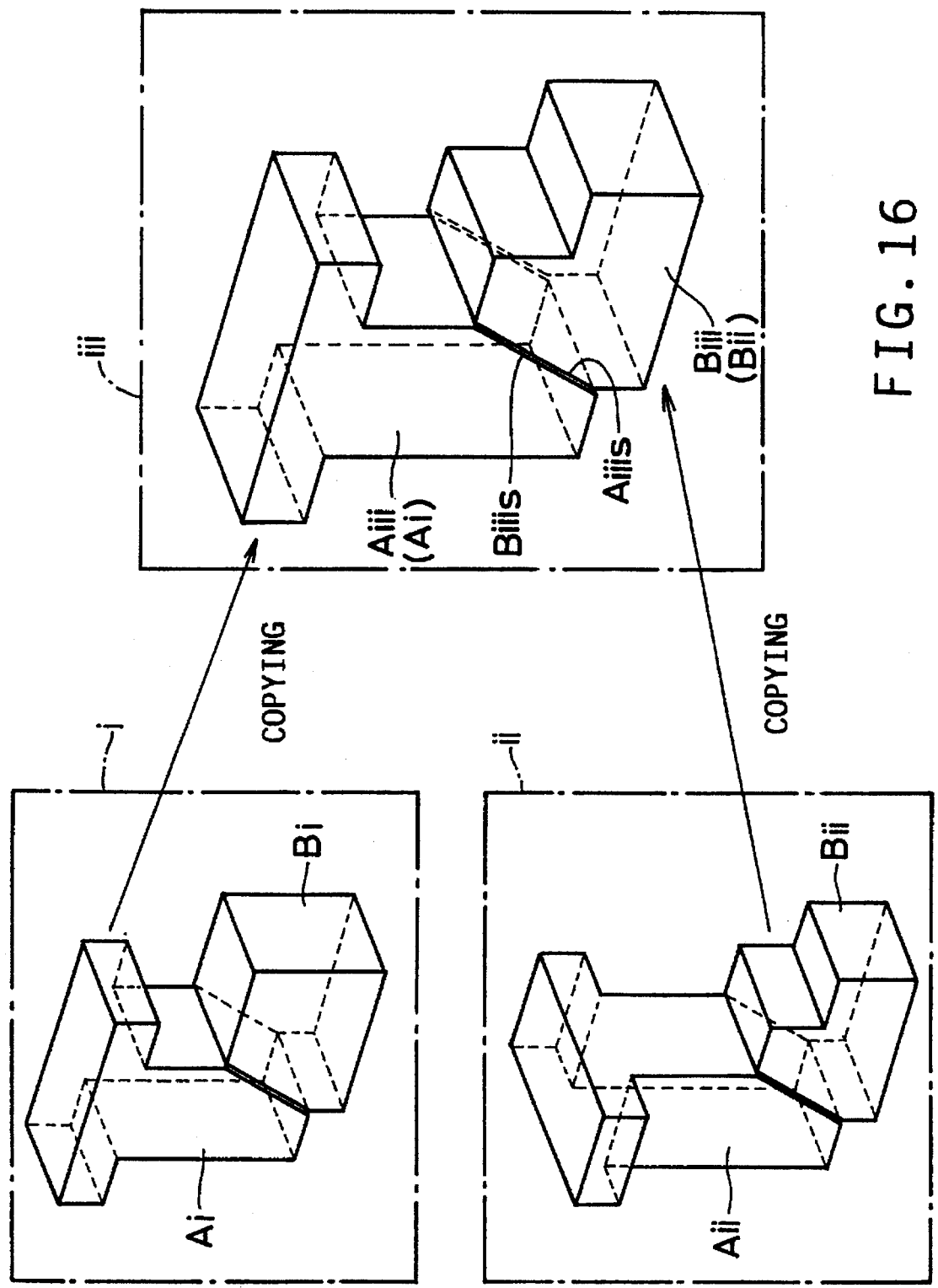
FIG. 16 is a perspective view showing a process in which a solid model of a structural assembly is generated utilizing already generated solid models of components of other structural assemblies.

The auxiliary data storage 26 has a multiplicity of memory areas 26-1, 26-2 . . . 26-n which correspond to different structural assemblies each consisting of two or more components. Each memory area 26-n stores a part data file 30 for a structural assembly. Examples of structural assemblies i, ii and iii are illustrated in FIG. 16. Each of these assemblies consists of two components A and B, more specifically, (Ai and Bi), (Aii and Bii), or (Aiii and Biii).

Figure 15:
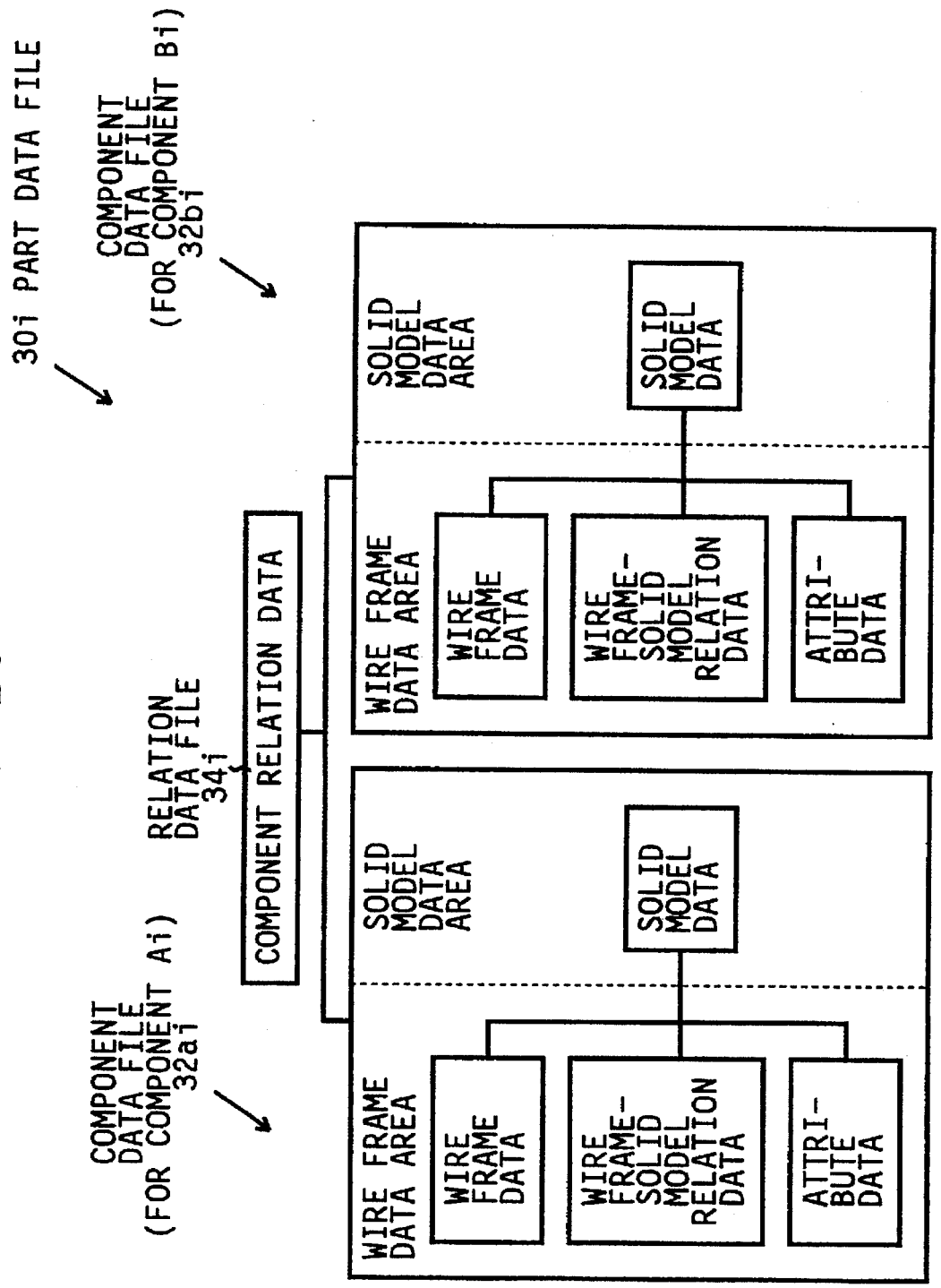
FIG. 15 is a view illustrating an example of a part data file stored in the auxiliary data storage of the apparatus of FIG. 14.

Referring to FIG. 15 illustrating an arrangement of the part data file 30i for the structural assembly i by way of example, the part data file 30i has two component data files 32ai and 32bi for the components Ai and Bi of the assembly i, and one relation data file 34i which stores component relation data representative of a positional relationship between the two components Ai and Bi. Each of the component data files 32ai, 32bi has a wire frame data area, and a solid model data area for storing solid model data representative of a three-dimensional solid model of the component Ai, Bi. For example, the wire frame data area of the component data file 32ai for the component Ai stores wire-frame-related data which consist of: wire frame data representative of a two-dimensional wire frame model of the component Ai; wire frame-solid model relation data representative of a relationship between the wire frame model and the solid model; and attribute data representative of the attributes associated with cross sectional shapes used to define the solid model as described above with respect to the first embodiment.

For instance, the component relation data stored in the relation data file 34i of the part data file 30i for the structural assembly i include data indicative of mutually contacting surfaces of the two components Ai and Bi. The wire frame data stored in the component data file 32ai include coordinate data of the shape definition lines of each wire frame of the component Ai, while the wire frame-solid model relation data stored in the component data file 32ai include data indicative of relationships between the shape definition lines of the wire frames and the shape definition lines or surfaces of the solid model of the component Ai. The attribute data stored in the component data file 32ai include data indicative of directions of movement or rotation of each cross sectional shape element of the solid model of the component Ai, and the distance of movement or rotating angle of the cross sectional plane.

Figure 17A:
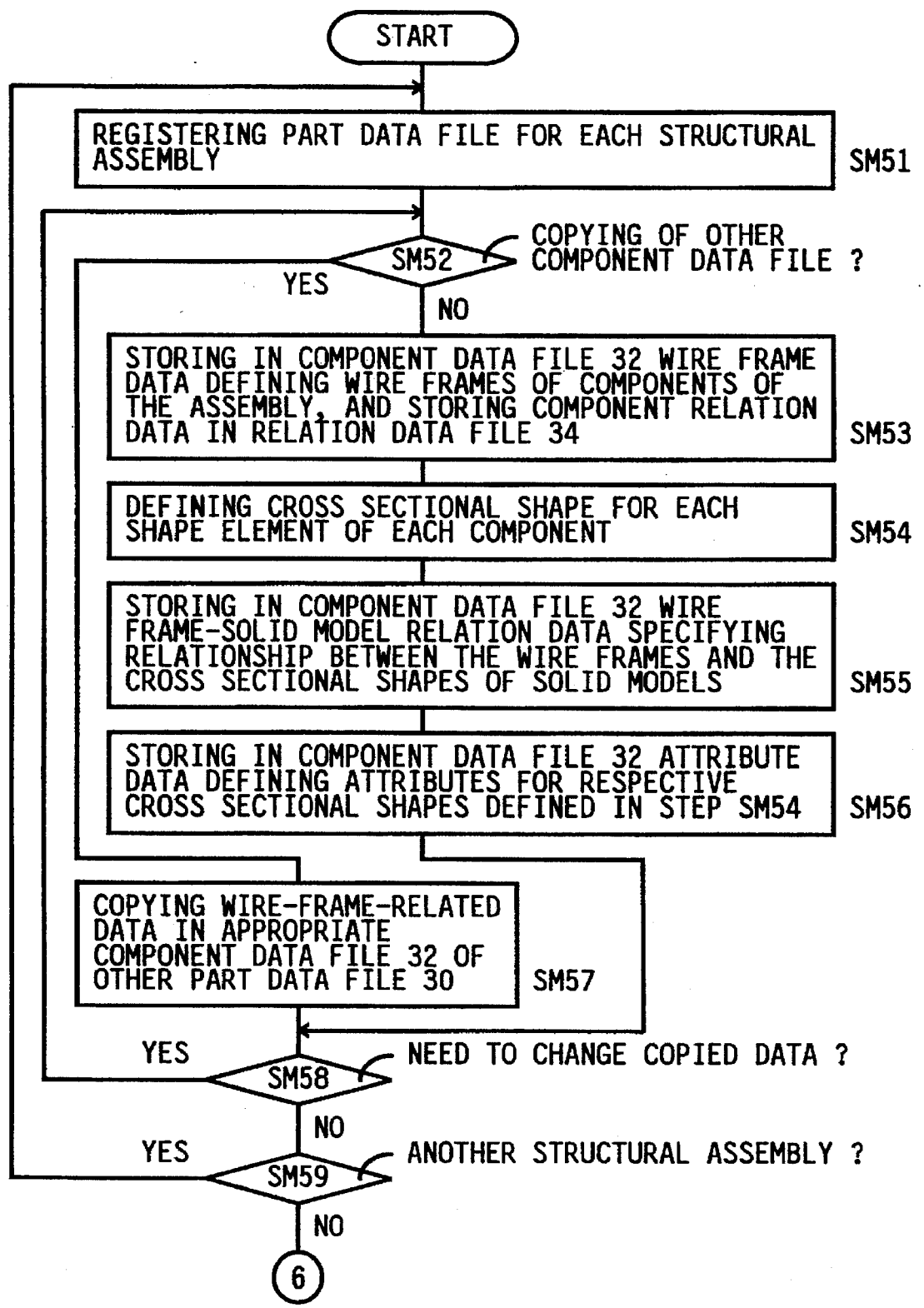
FIG. 17 is a flow chart illustrating a main routine for generating a solid model of a new structural assembly in the embodiment of FIG. 14.
Figure 17B:
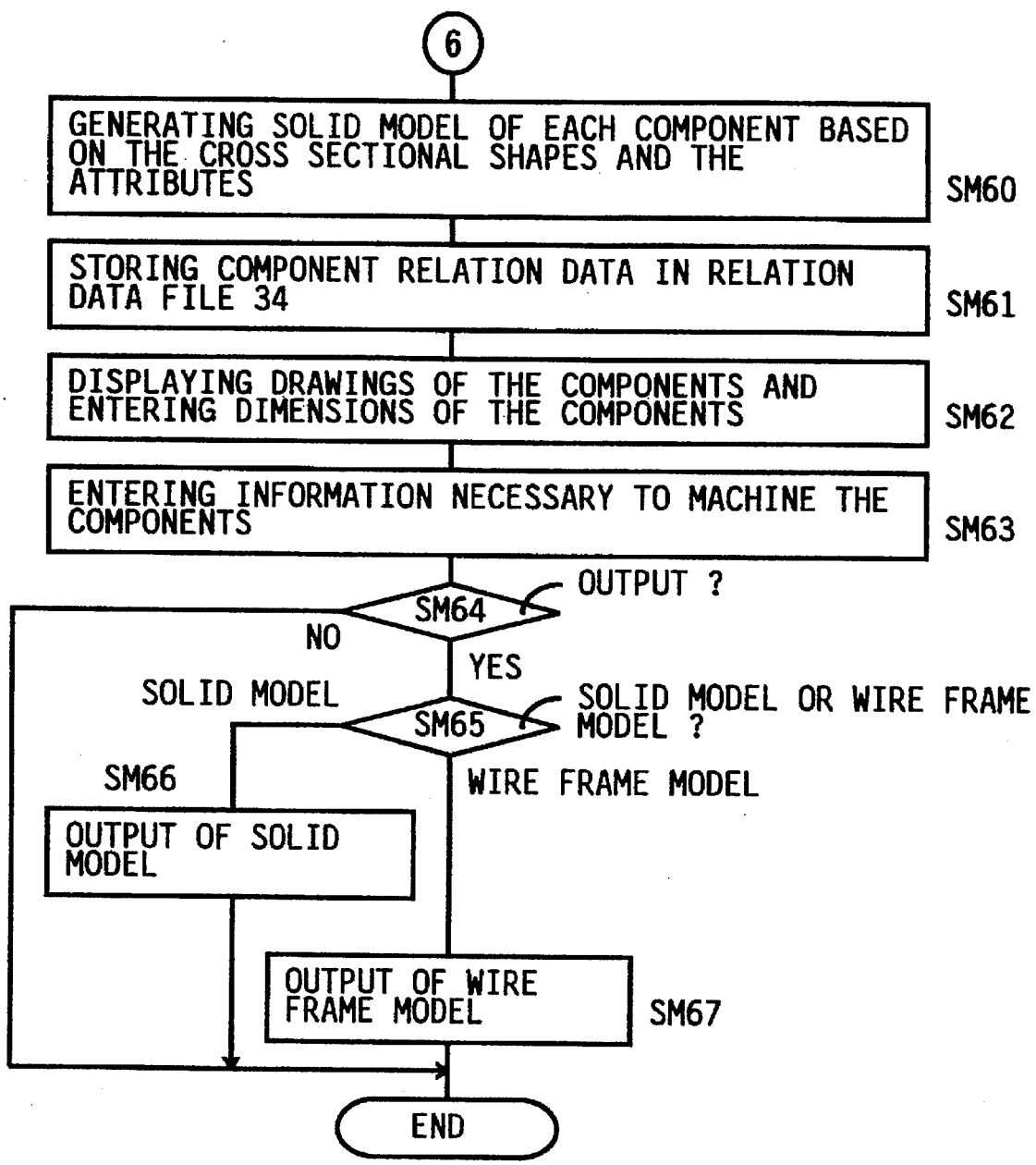

Referring to the flow chart of FIGS. 17A and 17B illustrating a main routine, there will be described an operation of the present apparatus, to generate a solid model of the structural assembly iii shown in FIG. 16, by way of example. The assembly iii consists of the component Ai of the assembly i and the component Bii of the assembly ii.

The main routine is initiated with step SM51 (FIG. 17A) to register or open the appropriate part data file 30iii. Step SM51 is followed by step SM52 to determine whether a copying of the component data file or files of the other part data file or files is required by the operator. In the present example, the operator may require the copying of the wire-frame-related data in the wire frame data areas of the component data files 32ai and 32bii for the components Ai and Bii. However, an operation when a negative decision (NO) is obtained in step SM52 will be described first.

Step SM52 is followed by step SM53 when the negative decision (NO) is obtained in step SM52. In step SM53, wire frame data defining wire frame models of the components Aiii and Biii of the assembly iii are stored in the component data file 32aiii and 32biii of the part data file 30iii, and the component relation data representative of the positional relationship between the wire frame models of the components Aiii and Biii are stored in the relation data file 34iii. The component relation data include data indicative of the relationship between the local coordinate systems in which the wire frame models of the components Aiii, Biii are defined.

Figure 18:
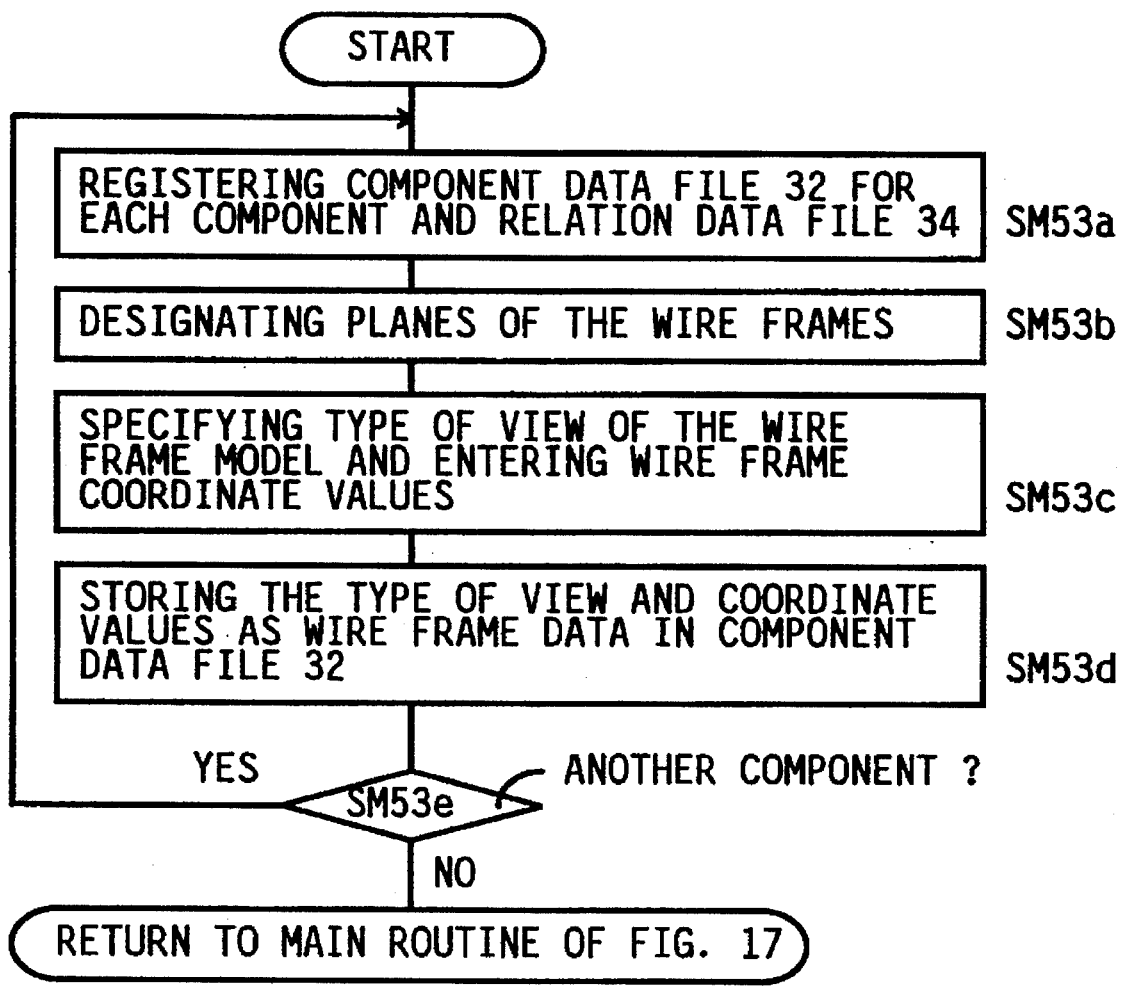
FIG. 18 is a flow chart showing an operation in step SM53 of the main routine of FIG. 17, to initially define wire frame models of components of a structural assembly.

The operation in step SM53 is illustrated in detail in the flow chart of FIG. 18. Initially, step SM53a is implemented to register the appropriate component data file (32aiii or 32biii) for the component (Aiii or Biii), and the relation data file 34iii, through the data input device 18. Then, step SM53b is implemented to designate planes of definition of the wire frames, through the data input device 18. Step SM53b is followed by step SM53c to specify the type of view represented by the wire frame model, and enter the coordinate values indicative of the positions of the individual wires of each wire frame in the x-y-z rectangular coordinate system. The data representative of the type of view and the coordinate values are stored as part of the wire-frame-related data in the wire frame data area of the appropriate component data file (32aiii or 32biii) specified in step SM53a. Then, the control flow goes to step SM53e to determine whether the assembly iii in question has another component. If an affirmative decision (YES) is obtained in step SM53e, steps SM53a–SM53d are repeated. In the present specific example, steps SM53a–SM53d are repeated twice, a first cycle for the component Aiii, and a second cycle for the component Biii.

Step SM53 is followed by steps SM54, SM55 and SM56 to enter data necessary for initial definition of a solid model of the assembly iii, or solid models of the components Aiii and Biii. An operation in step SM4 to define cross sectional shapes used for defining the solid models is illustrated in detail in the flow chart of FIG. 19.

Figure 19:
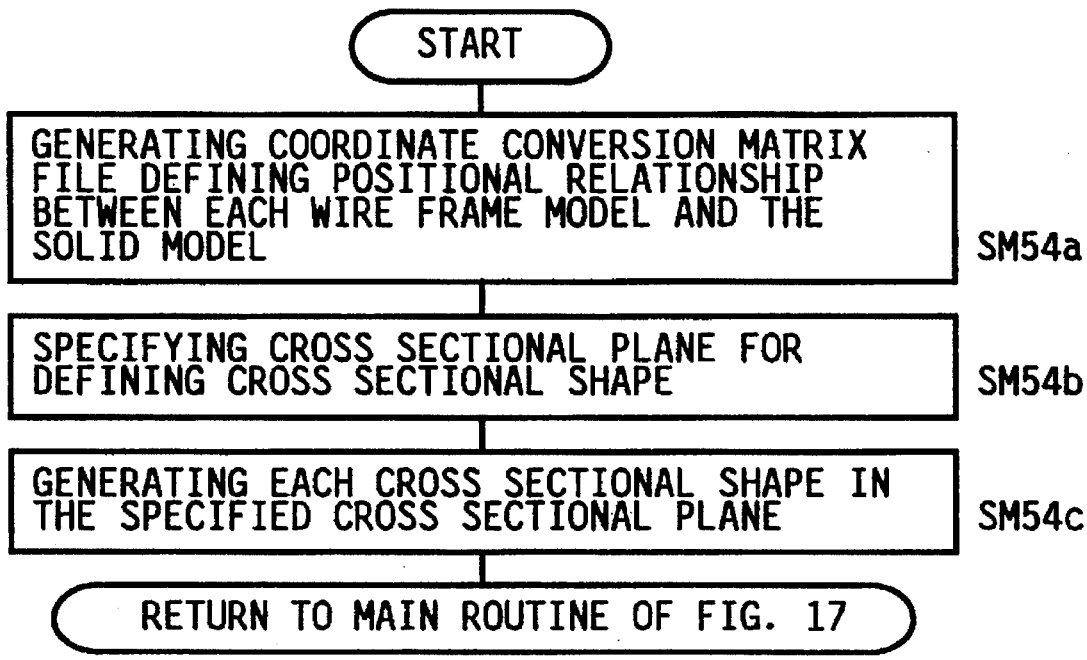
FIG. 19 is a flow chart showing an operation in step SM54 of the main routine of FIG. 17, to define a cross sectional shape of each shape element of each component.

The sub-routine of FIG. 19 is initiated with step SM54a in which the coordinate conversion matrix file defining the positional relationship between each wire frame model and the solid model is generated. Step SM54b is then implemented to specify the plane in which each cross sectional shape is defined. Step SM54b is followed by step SM54c to define each cross sectional shape in the specified plane.

Then, the control flow goes to step SM55 to store in the component data files 32aiii, 32biii wire frame-solid model relation data which represent the relationship between the wire frames and the cross sectional shapes used to define the solid models. Details of this step SM55 are shown in the flow chart of FIG. 20.

Figure 20:
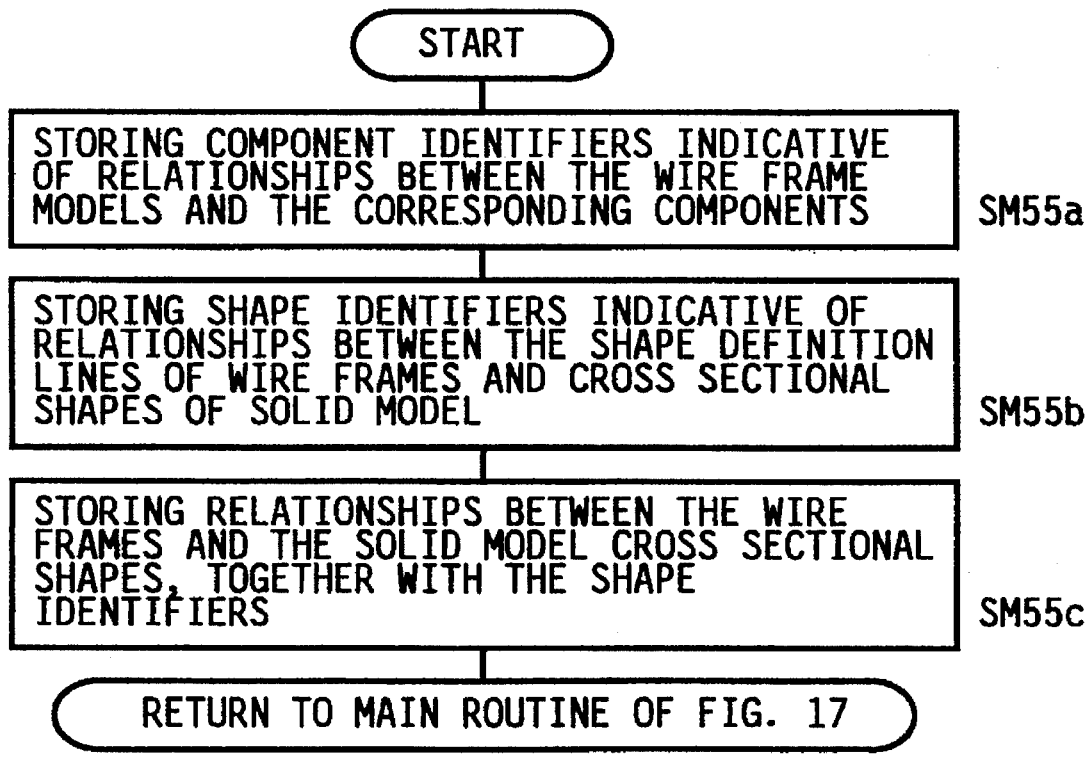
FIG. 20 is a flow chart showing an operation in step SM55 of the main routine of FIG. 17, to specify a relationship between the wire frames and the cross sectional shapes.

The sub-routine of FIG. 20 is initiated with step SM55a in which component identifiers indicative of relationships between the wire frame models and the corresponding components Aiii, Biii are stored as part of the wire frame-solid model relation data in the appropriate component data files 32aiii, 32biii. In the next step SM55b, shape identifiers indicative of relationships between the shape definition lines of the wire frames and the cross sectional shapes of the solid models are stored as another part of the wire frame-solid model relation data in the component data files 32aiii, 32biii. Further, relationships between the wire frames and the solid model cross sectional shapes are stored, in relation to the shape identifiers, also in the component data files 32aiii, 32biii.

Then, step SM56 is implemented to store the attribute data in the component data files 32*aiii*, 32*biii*, through the data input device 18. The attribute data, which also constitute part of the wire-frame-related data, represent an attribute associated with each of the cross sectional shapes defined in step SM54. An operation in this step SM56 will be described by reference to the flow chart of FIG. 21.

Figure 21:
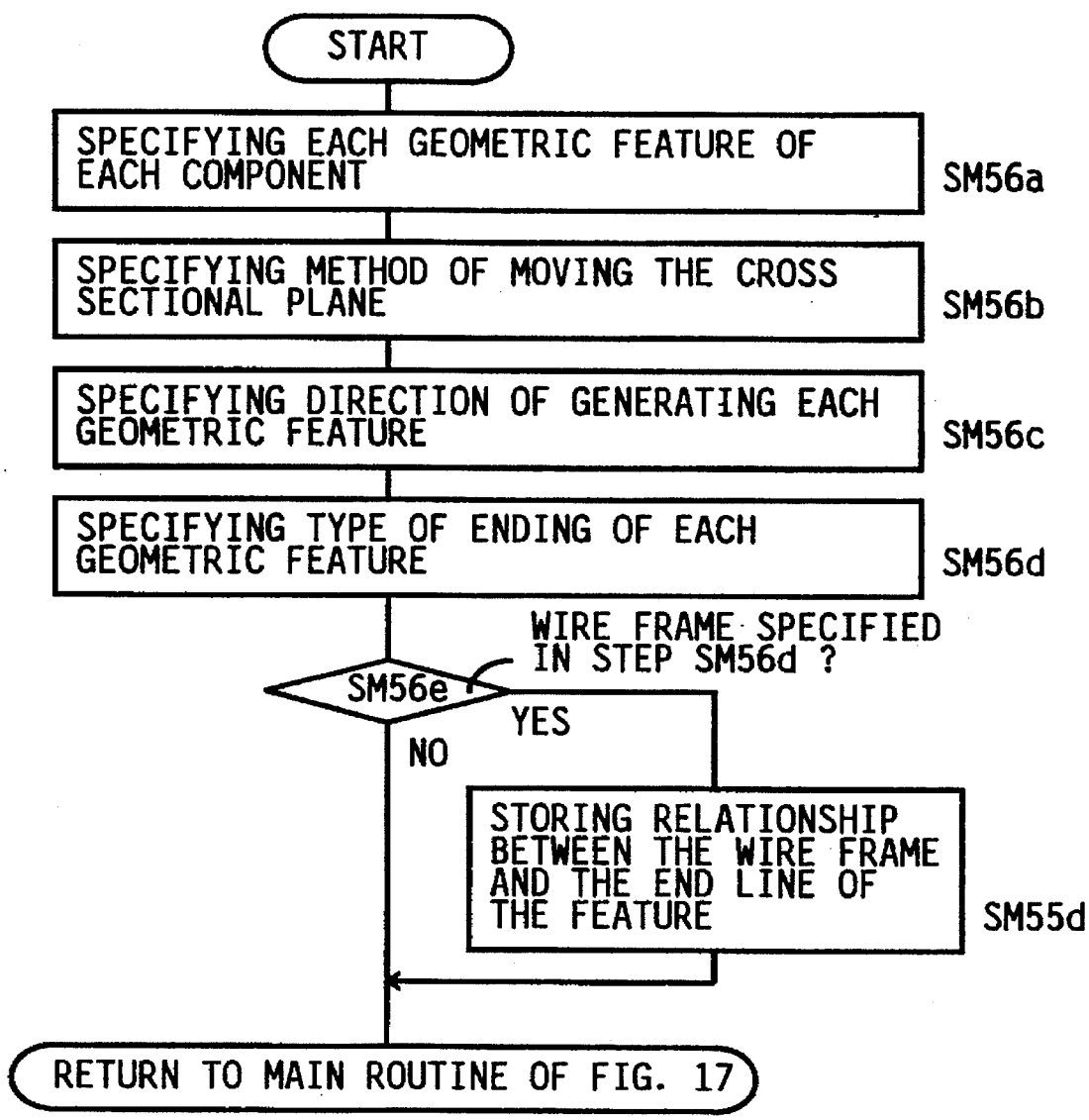
FIG. 21 is a flow chart showing an operation in step SM56 of the main routine of FIG. 17, to give an attribute to each cross sectional shape of the component.
Figure 22:
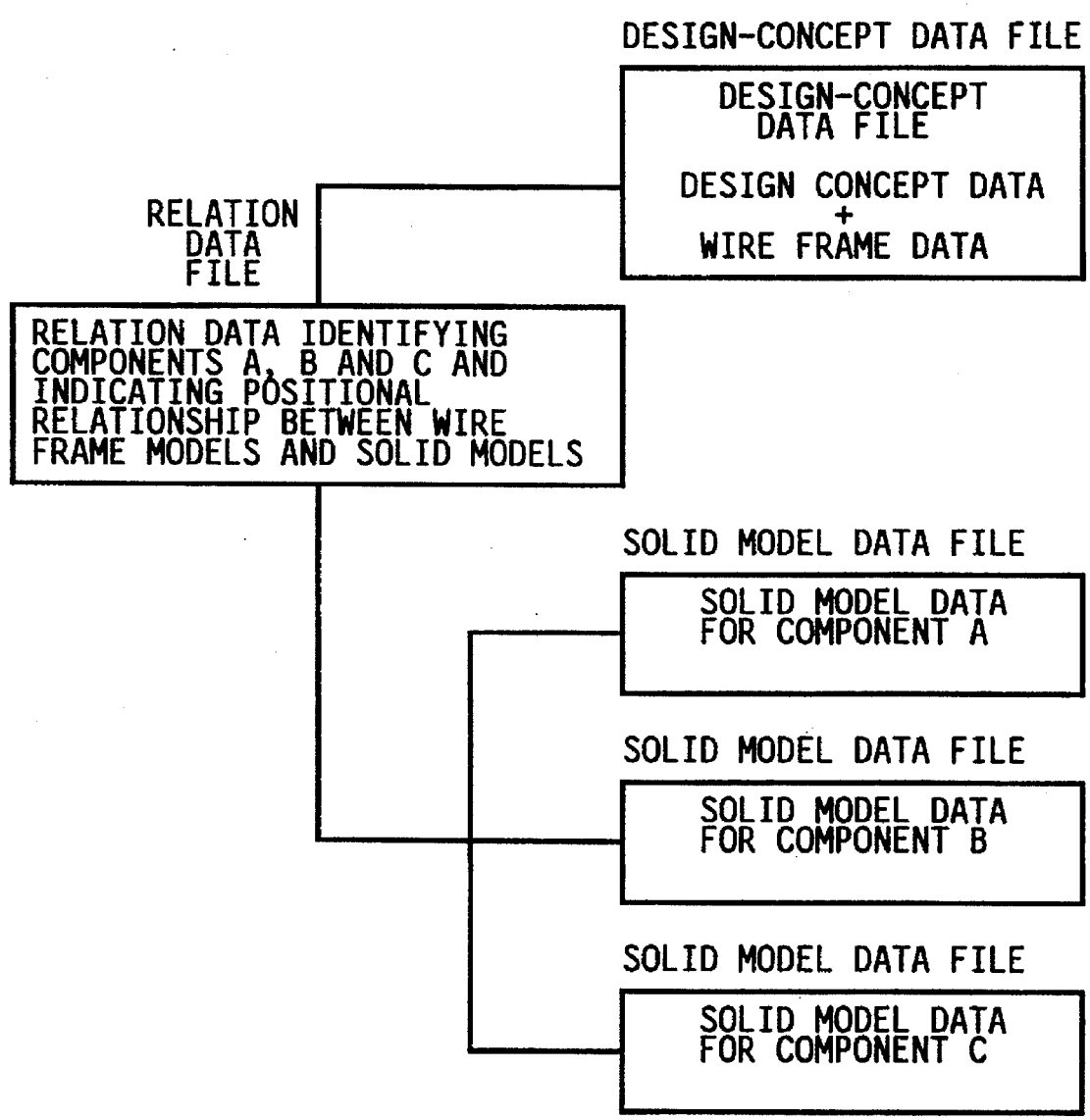
FIG. 22 is a block diagram indicating an arrangement of various data files used in a conventional solid model generating apparatus.

The sub-routine of FIG. 21 is initiated with step SM56*a* in which each geometric feature of each component Aiii, Biii is specified. Then, steps SM56*b*, SM56*c*, SM56*d*, SM56*e* which are similar to steps SM4*b*–SM4*e* of FIG. 8 are sequentially implemented. If an affirmative decision (YES) is obtained in step SM56*e*, the control flow goes to step SM55*d* which is similar to step SM3*d* of FIG. 8.

If an affirmative decision (YES) is obtained in step SM52, that is, if the operator requires copying of the wire-frame-related data in the wire frame data areas of the component data files 32*ai* and 32*bii* of the part data files 30*i* and 30*ii*, the control flow goes to step SM57 to retrieve the wire-frame-related data stored in the wire frame data areas of those component data files 32*ai*, 32*bii* which have been specified by the operator through the data input device 18. In the present example, the wire-frame-related data retrieved from the wire frame data area of the component data file 32*ai* of the part data file 30*i* are stored in the wire frame data area of the component data file 32*aiii* of the part data file 30*iii*, while the wire-frame-related data retrieved from the wire frame data area of the component data file 32*bii* of the part data file 30*ii* are stored in the wire frame data area of the component data file 32*biii* of the part data file 30*iii*.

Steps SM56 and SM57 are followed by step SM58 to determine whether the data retrieved from the other part data file or files should be changed or modified. If an affirmative decision (YES) is obtained in step SM58, steps SM52–SM56 (SM57) are repeated. If a negative decision (NO) is obtained in step SM58, the control flow goes to step SM59 to determine whether there is another structural assembly whose solid model is to be generated. If an affirmative decision (YES) is obtained in step SM59, steps SM51–SM58 are repeated.

It will be understood that steps SM51 through SM59 are provided to enable the operator to define a desired structural assembly, by specifying a wire frame corresponding to each cross sectional shape element which cooperates with the corresponding attribute to define a shape element of the solid model. Thus, the operator may express a design concept of a structural assembly in the form of two-dimensional wire frames as indicated in FIG. 13.

If a negative decision (NO) is obtained in step SM59, the control flow goes to step SM60 (FIG. 17B) in which the solid models of the components Aiii and Biii are generated by the solid modeler on the basis of the cross sectional shapes defined in steps SM54*b*, SM54*c* and the attributes defined in steps SM56*a*–SM56*e*. The solid model data representative of the generated solid models are stored in the solid model data areas of the appropriate component data files 32*aiii* and 32*bii* in which the wire frame data and the related data are stored in the wire frame data areas.

After the solid model data of the components Aiii and Biii have been stored in step SM60 in the component data files 32*aiii* and 32*biii* of the part data file 30*iii*, step SM61 is implemented to store the component relation data representative of the positional relationship between the components Aiii and Biii in the relation data file 34*iii* of the part data file 30*iii*. The component relation data stored in this step SM61 include coordinate values or position vectors which indicate the relative positions of the solid models of the components Aiii, Biii. Explained in detail, the solid models of the components Aiii and Biii are displayed on the screen of the display device 20, and the zero points of the displayed wire frame models of the two components are specified for matching of their coordinate systems or vector directions, and data are entered through the data input device 18 to specify that sliding surface Aii is of the component Aiii and sliding surface Bii is of the component Biii both of which lie on the same plane.

Step SM61 is followed by step SM62 to activate the display device 20 to display the drawings of the structural assembly iii, and enter the dimensions associated with various shape definition lines in the drawings. The dimension data are stored in an appropriate portion of the part data file 30*iii*. In the following step SM63, information necessary to machine or manufacture the components Aiii, Biii are also stored.

The control flow then goes to step SM64 to determine whether the operator desires to have an output of the content of any part data file 30, for example, part data file 30*iii* for the structural assembly iii whose solid model has been generated. This determination is effected based on a command signal received from the data input device 18. If a negative decision (NO) is obtained in step SM64, the present main routine is terminated. If an affirmative decision (YES) is obtained in step SM64, step SM65 is implemented to determine whether the operator desires the output of the solid model or the wire frame model, based on a signal from the data input device 18. If the received signal indicates the operator's desire to output the solid model, step SM66 is implemented to retrieve the selected component data file or files 32 or all the component data files 32, and erase the retrieved wire-frame-related data so that only the solid model data of the read-out file or files 32 are used to output the solid model. If the solid model data are retrieved from the two or more component data files 32, the component relation data are also retrieved from the relation data file 34. Then, the display device 20 and the recording device 24 are operated to display or record the solid model or models, according to the solid model data. Alternatively, the solid model data and the component relation data are sent to an external device. If the operator desires to output the wire frame model, step SM67 is implemented to retrieve the selected component data file or files 32 or all the component data files 32, and erase the retrieved solid model data so that only the wire-frame-related data are used to output the wire frame model. If the wire frame data are the two or more component data files 32, the component relation data are also retrieved from the relation data file 34. Then, the display device 20 and the recording device 24 are operated to display or record the wire frame model or models according to the wire-frame-related data, or the wire-frame-related data are sent to the external device.

In the present embodiment described above, the memory areas 26-n of the auxiliary data storage 26 are used for the part data files 30 for different structural assemblies of components, namely, part data files 30*i*, 30*ii* and 30*iii* for the structural assemblies i, ii and iii in the illustrated example described by reference to FIG. 16. Each part data file 30 has two or more component data files 32 corresponding to the individual components of each structural assembly, and one relation data file 34 storing the component relation data. Each component data file 32 has both the wire frame data area and the solid model data areas in which are stored the wire-frame-related data and the solid model data, which respectively represent the wire frame model and the solid model of the component in question. In the illustrated example, the wire-frame-related data and the solid model data of the components Ai and Bi of the structural assembly i are stored in the component data files 32*ai* and 32*bi* of the part data file 30*i*, respectively, while the wire-frame-related data and the solid model data of the components Aii and Bii of the structural assembly ii are stored in the component data files 32*aii* and 32*bii* of the part data file 30*ii*, respectively. Similarly, the wire-frame-related data and the solid model data of the components Aii and Biii of the structural assembly iii are stored in the component data files 32*aiii* and 32*biii* of the part file data 30*iii*, respectively. Further, the component relation data of the assemblies i, ii and iii are stored in the respective relation data files 34*i*, 34*ii* and 34*iii*. The component relation data include data representative of the positional relationship between the wire frame models of the components of the same assembly, and data representative of the positional relationship between the solid models of the components of the same assembly.

According to the present embodiment, only the desired component data file or files 32 (32*ai*, 32*bi*, 32*aii*, 32*bii*, 32*aiii*, 32*biii*) of any desired part data file or files 30 can be copied and utilized to generate a solid model of a new structural assembly. When the wire frame data of the component Ai of the structural assembly i is utilized for generating a solid model of the structural assembly iii, for example, only the component data file 32*ai* for the component Ai can be utilized independently of the component data file 32*bi* for the component Bi. Consequently, it is not necessary to erase or remove the unnecessary data stored in the component data file 32*bi*. Thus, the present arrangement permits easy utilization of already stored data of any component of any already designed structural assembly to design a new structural assembly, and therefore assures increased designing efficiency and reduced designing error due to removal of the unnecessary portion of the copied data.

Although the present embodiment illustrated in FIGS. 17A and 17B is adapted such that the wire-frame-related data in the wire frame data area of the copied component data file 32 is utilized in step SM60 to generate the solid model data of a new structural assembly, the solid model data of the copied component data file may be directly used to generate the solid model of the new assembly. In this case, step SM60 need not be implemented for the component whose solid model data are obtained by copying in step SM57.

In the present second embodiment, steps SM1 through SM10 correspond to first data storage control means for storing the wire-frame-related data and the solid model data in respective areas of each of the different component data files 32 provided for different components of each structural assembly. Further, steps SM53 and SM11 correspond to second data storage control means for storing the component relation data in the relation data file 34 which is different from the component data files 32 and which cooperate with the component data files 32 to constitute each part data file 30.

It is also noted that the use of different component data files for different components of a structural assembly and the use of each component data file to store both the wire-frame-related data and the solid model data facilitate reproduction of the solid model of any desired one of the components of a structural assembly at a desired opportunity, for three-dimensional geometric verification of the selected component.

It is further noted that since the present embodiment is adapted to process data associated with each one of the components at one time, the required storage capacity of the primary data storage 14 of the computer 12 can be made relatively small, and the storage 14 is available at a comparatively low cost. Conventionally, wire frame data and solid model data associated with all components of a structural assembly must be processed at one time when the wire frame data or solid model data of the assembly are partially modified, or when the part data file of the assembly is copied, for example.

Although the second embodiment is adapted such that solid models are generated on the basis of wire frame models, surface models obtained from the wire frame models may be used to generate the solid models.

While the present invention has been described in detail in its presently preferred embodiments, for illustrative purpose only, it is to be understood that the invention is not limited to the details of the illustrated embodiments, but may be embodied with various changes, modifications and improvements, which may occur to those skilled in the art, in the light of the foregoing teachings.

What is claimed is:

1. A method of modifying solid models of a plurality of designated components, which have already been generated by a solid generating apparatus wherein a solid modeler automatically generates solid models representative of a plurality of components according to cross sectional shapes of the components and attributes associated with said cross sectional shapes, said cross sectional shapes and attributes defining said solid models of said components, said method comprising the steps of:

preparing a plurality of shape data files storing respective shape data sets representative of shapes of said plurality of designated components;

storing a predetermined relationship between said shape data sets and said cross sectional shapes or said attributes, or between said shape data sets and said cross sectional shapes and said attributes;

manually changing the shape data sets representative of all of said designated components successively, so that said solid modeler automatically modifies the already generated solid models of said designated components;

automatically changing said cross sectional shapes or said attributes of said designated components, or said cross sectional shapes and said attributes of all of said designated components, on the basis of the changed shape data sets of said designated components, and according to said predetermined relationship;

automatically activating said solid modeler to modify the already generated solid models of all of said designated components successively at one time, on the basis of said cross sectional shapes and said attributes at least one of which has been changed.

2. A method according to claim 1, wherein each of said shape data sets stored in said shape data files includes wire frame data representative of at least one two-dimensional wire frame model consisting of shape definition lines which define a shape of a corresponding one of said designated components.

3. A method according to claim 2, wherein said step of successively changing the shape data sets comprises displaying the wire frame models of said designated components on a same display screen in a predetermined positional relationship with each other, and entering data necessary to change said wire frame data representative of said at least one wire frame model of each of said designated component.

4. A method according to claim 1, wherein each of said shape data sets stored in said shape data files includes attribute definition data corresponding to each of said attributes, and said step of successively changing the shape data sets comprises entering data necessary to change said attribute definition data.

5. An apparatus for modifying solid models of a plurality of designated components, which have already been generated by a solid model generating apparatus wherein a solid modeler automatically generates solid models representative of a plurality of components according to cross sectional shapes of the components and attributes associated with said cross sectional shapes, said cross sectional shapes and attributes defining said solid models of said components, said apparatus comprising:

shape data file memory means having a plurality of shape data files storing respective shape data sets representative of shapes of said plurality of designated components;

a relationship data memory for storing a predetermined relationship between said shape data sets and said cross sectional shapes or said attributes, or between said shape data sets and said cross sectional shapes and said attributes;

altering means for permitting an operator of the apparatus to change the shape data sets representative of all of said designated components successively, so that said solid modeler automatically modifies the already generated solid models of said designated components;

definition data updating means for automatically changing said cross sectional shapes or said attributes, or said cross sectional shapes and said attributes of all of said designated components, on the basis of the changed shape data sets of said designated components, and according to said predetermined relationship; and solid model modifying means for activating said solid modeler to modify the already generated solid models of all of said designated components successively at one time, on the basis of said cross sectional shapes and said attributes at least one of which has been changed.

6. An apparatus according to claim 5, wherein each of said shape data sets stored in said shape data files includes wire frame data representative of a two-dimensional wire frame model consisting of shape definition lines which define a shape of a corresponding one of said designated components.

7. An apparatus according to claim 6, further comprising a display device and a data input device, and wherein said altering means activates said display device to display the wire frame models of said designated components on a same screen of the display device in a predetermined positional relationship with each other, and receives from said data input device data necessary to change said wire frame data representative of said wire frame model of each of said designated component.

8. An apparatus according to claim 5, further comprising a data input device, and wherein each of said shape data sets stored in said shape data files includes attribute definition data corresponding to each of said attributes, and said altering means receives from said data input device data necessary to change said attribute definition data.

* * * * *

UNITED STATES PATENT AND TRADEMARK OFFICE
CERTIFICATE OF CORRECTION

PATENT NO. : 5,649,076                 Page 1 of 2
DATED : Jul. 15, 1997
INVENTOR(S) : Koichi Nishizaka, et al It is certified that error appears in the above-identified patent and that said Letters Patent is hereby corrected as shown below:

Item [57]

IN THE ABSTRACT: Line 7: After "such" insert --as--.

| Column | Line | |
|---|---|---|
| 1 | 59 | Change "side" to --part--. |
| 2 | 58 | Before "described" insert --as--. |
| 5 | 12 | Change "component" to --components--. |
| 13 | 35 | Change "implement" to --implements--. |
| 14 | 1 | Change "implement" to --implements--. |

UNITED STATES PATENT AND TRADEMARK OFFICE
CERTIFICATE OF CORRECTION

PATENT NO. : 5,649,076
DATED : Jul. 15, 1997
INVENTOR(S) : Koichi Nishizaka, et al It is certified that error appears in the above-identified patent and that said Letters Patent is hereby corrected as shown below:

| Column | Line | |
|--------|------|---|
| 14 | 6 | Change "implement" to --implements--. |
| 14 | 29 | After "tool" delete ",". |
| 15 | 27 | Before "by" insert --is--. |
| 18 | 34 | Change "that" to --than does--. |
| 24 | 65 | Change "component" to --components--. |
| 26 | 23 | Change "component" to --components--. |

Signed and Sealed this

Twenty-first Day of April, 1998

Attest:

BRUCE LEHMAN

*Attesting Officer*           *Commissioner of Patents and Trademarks*

UNITED STATES PATENT AND TRADEMARK OFFICE
CERTIFICATE OF CORRECTION

PATENT NO. : 5,649,076
DATED : July 15, 1997
INVENTOR(S) : Koichi Nishizaka, et. al.

It is certified that error appears in the above-identified patent and that said Letters Patent is hereby corrected as shown below:

On title page, under [73] Assignee: add the second assignee as follows:
--B P A Inc., Fukuoka-shi, Japan--

Signed and Sealed this

Twentieth Day of October, 1998

*Attest:*

BRUCE LEHMAN

*Attesting Officer*    *Commissioner of Patents and Trademarks*